United States Patent
Chatterjee

(10) Patent No.: US 8,401,897 B1
(45) Date of Patent: Mar. 19, 2013

(54) SYSTEM AND METHOD OF DISPLAYING ADS BASED ON LOCATION

(75) Inventor: Surojit Chatterjee, Fremont, CA (US)

(73) Assignee: Google Inc., Mountain View, CA (US)

( * ) Notice: Subject to any disclaimer, the term of this patent is extended or adjusted under 35 U.S.C. 154(b) by 790 days.

(21) Appl. No.: 12/550,946

(22) Filed: Aug. 31, 2009

(51) Int. Cl.
*G06Q 30/00* (2012.01)
(52) U.S. Cl. .................................................. 705/14.1
(58) Field of Classification Search ................... 705/14.1
See application file for complete search history.

(56) References Cited

U.S. PATENT DOCUMENTS

| | | | |
|---|---|---|---|
| 7,778,872 | B2 | 8/2010 | Kamangar et al. |
| 7,870,023 | B2 | 1/2011 | Ozer et al. |
| 2005/0071417 | A1* | 3/2005 | Taylor et al. ............... 709/200 |
| 2006/0282314 | A1 | 12/2006 | Zamanian et al. |
| 2007/0260515 | A1 | 11/2007 | Schoen et al. |

OTHER PUBLICATIONS

U.S. Appl. No. 12/173,600, filed Jul. 15, 2008.
How does AdWords know where to show my keyword-targeted ads?, http://adwords.google.com/support/aw/bin/answer.py?answer=6401&cbid=-1x8uk2i6g4iw..., retrieved from the Internet on Aug. 17, 2009, 1 page.
Is regional or customized targeting appropriate for me?, <http://adwords.google.com/support/aw/bin/answer.py?answer=6405&cbid=-1a6zyzgrk5fu>..., downloaded from the Internet on Aug. 17, 2009, 1 page.
If I choose regional or customized targeting, what will my ads look like?, <http://adwords.google.com/support/aw/bin/answer.py?answer=6406&cbid=--9kcyaij2oi71>..., downloaded from the Internet on Aug. 17, 2009, 1 page.
How does customized targeting work?,<http://adwords.google.com/support/aw/bin/answer.py?answer=7116&cbid=16s9zkm6rgcn..., downloaded from the Internet on Aug. 17, 2009, 1 page.
What geographical location targeting options do I have?, <http://adwords.google.com/support/aw/bin/answer.py?answer=11324&cbid=-1uegihhhc1..., downloaded from the Internet on Aug. 17, 2009, 1 page.

(Continued)

*Primary Examiner* — Daniel Lastra
(74) *Attorney, Agent, or Firm* — Lerner, David, Littenberg, Krumholz & Mentlik, LLP

(57) ABSTRACT

A system and method is provided that displays advertisements. In one aspect, advertisements are associated with target areas. When a request for information is received from a client device, the system and method determine a geographic area in which the client device may be located. Advertisements may be selected based on the likelihood that the client device is within the target area. In another aspect, advertisers may select prices for their advertisement that vary with such likelihood.

52 Claims, 21 Drawing Sheets

OTHER PUBLICATIONS

How do I target a different geographical location?, <http://adwords.google.com/support/aw/bin/answer.py?answer=113247&cbid=-gi5ugsknx2 . . . , downloaded from the Internet on Aug. 17, 2009, 1 page.

How do I target my ads to specific regions or cities?, <http://adwords.google.com/support/aw/bin/answer.py?answer=114672&cbid=11qhf9uwqea . . . , downloaded from the Internet on Aug. 17, 2009, 1 page.

How do I target my ads to countries or territories?,<http://adwords.google.com/support/aw/bin/answer.py?answer=114670&cbid=r0voscsob5v . . . , downloaded from the Internet on Aug. 17, 2009, 1 page.

How do I target my ads to a custom area?, <http://adwords.google.com/support/aw/bin/answer.py?answer=114826&cbid=eu5k9k5il9f . . . , downloaded from the Internet on Aug. 17, 2009, 1 page.

How do I add a list of locations to target?, <http://adwords.google.com/support/aw/bin/answer.py?answer=114824&cbid=-5um0rg1013 . . . , downloaded from the Internet on Aug. 17, 2009, 1 page.

El-Bakry, "Mapping Potenial", AmCham Egypt Publications, Business Monthly, Sep. 2007, http://www.amcham.org.eg/Publications/BusinessMonthly/december%2007/CoverStory.asp, retrieved from the Internet on Jul. 28, 2009, 4 pages.

Geo (marketing), http://en.wikipedia.org/wiki/Geo_(marketing), retrieved from the Internet on Jul. 28, 2009, 3 pages.

Geomarketin in Practice, <http://www.gfk-geomarketing.com/fileadmin/gfkgeomarketing/en/company/geomarketing_in_practice.pdf> First retrieved from Internet on Jul. 28, 2009, 24 pages.

Geolocation software, http://en.wikipedia.org/wiki/Geolocation_software, retrieved from the Internet on Jul. 28, 2009, 4 pages.

Google Location Service now in Mozilla Firefox, http://googlecode.blogspot.com/2009/04/google-location-services-now-in-mozilla.html, retrieved from the Internet on Aug. 17, 2009, 2 pages.

* cited by examiner

SYSTEM AND METHOD OF DISPLAYING ADS BASED ON LOCATION

BACKGROUND OF THE INVENTION

In targeted advertising, advertisers attempt to provide information to a specific audience. That is, to other individuals or businesses most likely to purchase or invest in the advertised product or service.

Systems heretofore have selected and displayed advertisements based on information received from user devices. Online marketing models such as those used by Google and Yahoo use keywords to target users interested in a particular topic. For example, a user searching for "pizza" is likely to be interested in a pizzeria or Italian restaurant. In that regard, advertisers are able to bid on search terms to have the advertiser's information displayed to users most likely to be interested in the advertiser's products or services.

BRIEF SUMMARY OF THE INVENTION

One aspect of the invention includes a method of providing an advertisement to a client device. The advertisement is one of a plurality of advertisements. The method includes receiving a request for information from a client device, the request including geographic information associated with the client device and an accuracy level associated with the geographic information; selecting an advertisement from the plurality of advertisements based in part on the request for information and the accuracy level of the received geographic information; and transmitting, to the client device, the selected advertisement.

Yet another aspect of the invention involves a method of providing an advertisement to a device, the advertisement is one of a plurality of advertisements each being associated with a target set of geographic locations. The method includes receiving a request for information from a device; receiving location data based on a geographic location of the device at the time of the request; determining a potential location set, where the potential location set comprises a set of geographic locations at which the device may be located, and wherein the potential location set is determined based on the location data; determining, for each advertisement, a likelihood value based on the likelihood that the device is at a geographic location that is within both the potential location set and the target set; selecting an advertisement from the plurality of advertisements based on the amount of the likelihood value; and providing the advertisement to the device.

Still another aspect of the invention relates to system that provides and displays advertisements. The system includes a first computer, at a first node on a network, having access to a set of instructions for execution by the first computer and having access to advertisements. Each of the advertisements is associated with a target set of geographic locations. The system also includes a client device at a second node of the network different from the first node. The client device comprises a user input device, an electronic display, a processor and instructions for execution by the processor. The instructions of the first computer include receiving a request for information from the client device, wherein the request includes location data; determining a potential location set comprising a set of geographic locations at which the device may be located at the time of the request, and wherein the potential location set is determined based on the location data; determining, for each advertisement, a likelihood value based on the likelihood that the device is at a geographic location that is within the both the potential location set and the target set; selecting an advertisement from the plurality of advertisements based on the likelihood value; and transmitting the selected advertisement to the client device over the network. The instructions of the client device include transmitting a request for information to the first computer and displaying, on the electronic display, the selected advertisement transmitted by the first computer.

A further aspect of the invention provides A computer-usable recording medium recorded with a program for use by a computing device. The program includes computer code that receives a request for information from a mobile device; computer code that determines a geographic source of the request; computer code that accesses a plurality of advertisements, each advertisement associated with a geographic target area; computer code that determines an amount of overlap between the geographic source of the request and the geographic target areas of the plurality of advertisements; computer code that selects an advertisement from the plurality of advertisements based on the amount of overlap; and computer code that transmits the selected advertisement.

Yet another aspect of the invention provides a method of determining price values for one of a plurality of advertisements. Each of the advertisements is associated with one or more confidence values and a target area. The method includes receiving, at a first node on a network, a price value for a plurality of confidence values associated with an advertisement, where a confidence value is indicative of the likelihood that an advertisement is displayed to a client device within the target area associated with the advertisement; receiving, from a client device on the network, location data indicative of a geographic area of the client device; determining a confidence value of the client device based on the likelihood that the client device is within the target area; determining a price value based on the confidence value; and transmitting, to a second node on the network, the price value.

An additional aspect of the invention provides a computer-usable recording medium recorded with a program for use by a computing device and for determining a price value associated with an advertisement. The advertisement is one of a plurality of advertisements, each associated with a target set and a likelihood value. The program includes computer code that receives a price value for a likelihood value associated with an advertisement. The likelihood value is indicative of the likelihood that a device is at a geographic location that is within the both a potential location set and a target set. The program also includes computer code that receives a request including location data from a client device; computer code that determines a potential location set comprising a set of geographic locations at which the device may be located at the time of the request, and wherein the potential location set is determined based on the location data; computer code that determines a likelihood value for the client device by comparing the potential location set and the target set associated with the plurality of advertisements; and computer code that determines a price value based on the likelihood value.

Still a further aspect of the invention provides a system. The system includes a first computer at a first node of a network. The first computer having access to a set of instructions for execution by the first computer and access to advertisements. Each advertisement associated is with a target set of geographic locations and a confidence value. The system also includes a second computer at a second node of the network different from the first node. The second computer comprises a user input device, an electronic display, a processor and instructions for execution by the processor. The instructions of the first computer include receiving a price value for a confidence value associated with an advertisement. A confidence value is indicative of the likelihood that an advertisement is displayed at a client computer on the network within the target area associated with the advertisement. The instructions of the first computer also include receiving location data indicative of a geographic area of a client computer on the network; determining a geographic area of the client computer; selecting an advertisement from a plurality of advertisements, each advertisement associated with a target area, such that the geographic area of the client device is within the target area of the selected advertisement; determining a confidence value of the client computer based on the likelihood that the geographic area of the client computer is within the target area associated with the advertisement; determining a price value based on the confidence value; and transmitting the determined price value.

An additional aspect of the invention provides a system. The system includes a first computer at a first node of a network, the first computer having access to a set of instructions for execution by the first computer and access to advertisements, each advertisement associated with an accuracy level. The system also includes a second computer at a second node of the network different from the first node, the second computer comprising a user input device, an electronic display, a processor and instructions for execution by the processor. The instructions of the first computer include receiving geographic information associated with a client device and an accuracy level associated with the geographic information; selecting an advertisement from the plurality of advertisements based on the accuracy level of the received geographic information and the accuracy level associated with the selected advertisement; and transmitting, to the client device, the selected advertisement. The instructions of the second computer include receiving the selected advertisement and displaying the selected advertisement.

Yet another aspect of the invention provides a computer-usable recording medium recorded with a program for use by a computing device and for providing an advertisement and a price value. The advertisement is one of a plurality of advertisements, where each of the plurality of advertisements being associated an accuracy value. The program includes computer code that computer code that receives, for each of the plurality of advertisements, a price value for an accuracy value associated with an advertisement, wherein the accuracy value is indicative of the accuracy of received geographic information; computer code that receives a request including geographic information from a client device; computer code that determines an accuracy value associated with the received geographic information; computer code that selects one of the plurality of advertisements based on the determined accuracy value and the accuracy values associated with the plurality of advertisements; and computer code that transmits both the selected accuracy value and the price value associated with the selected advertisement.

DETAILED DESCRIPTION

In one aspect, the system and method involve providing advertisements to network devices. Advertisements may be associated with geographic target areas. Upon receipt of a request for information, the system may determine a geographic area of the source of the request. The system may select an advertisement based on a comparison of the geographic target areas and the geographic location area of the source. The selected advertisement may be provided to the source.

Figure 1:
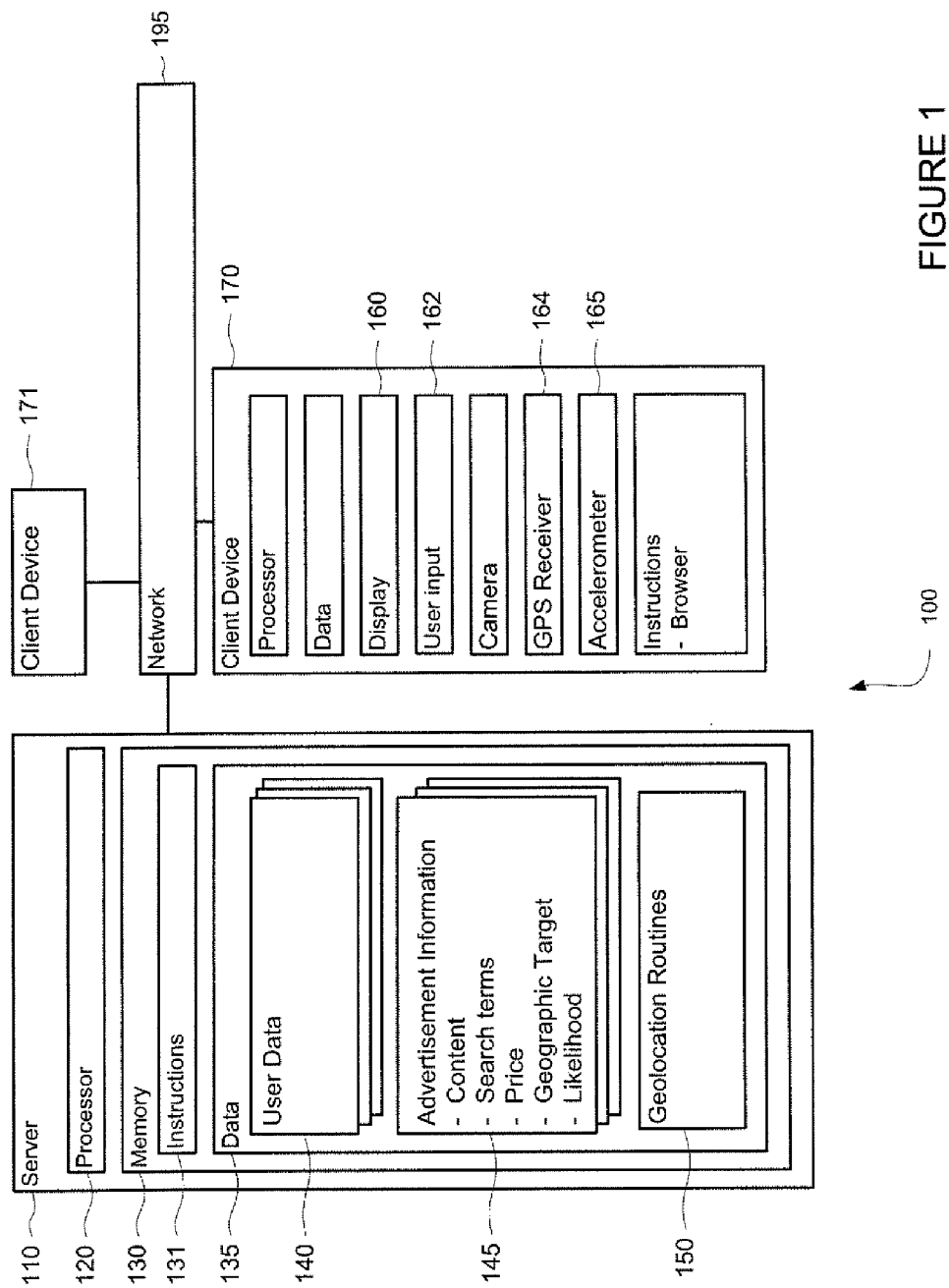
FIG. 1 is a functional diagram of a system in accordance with an aspect of the invention.
Figure 2:
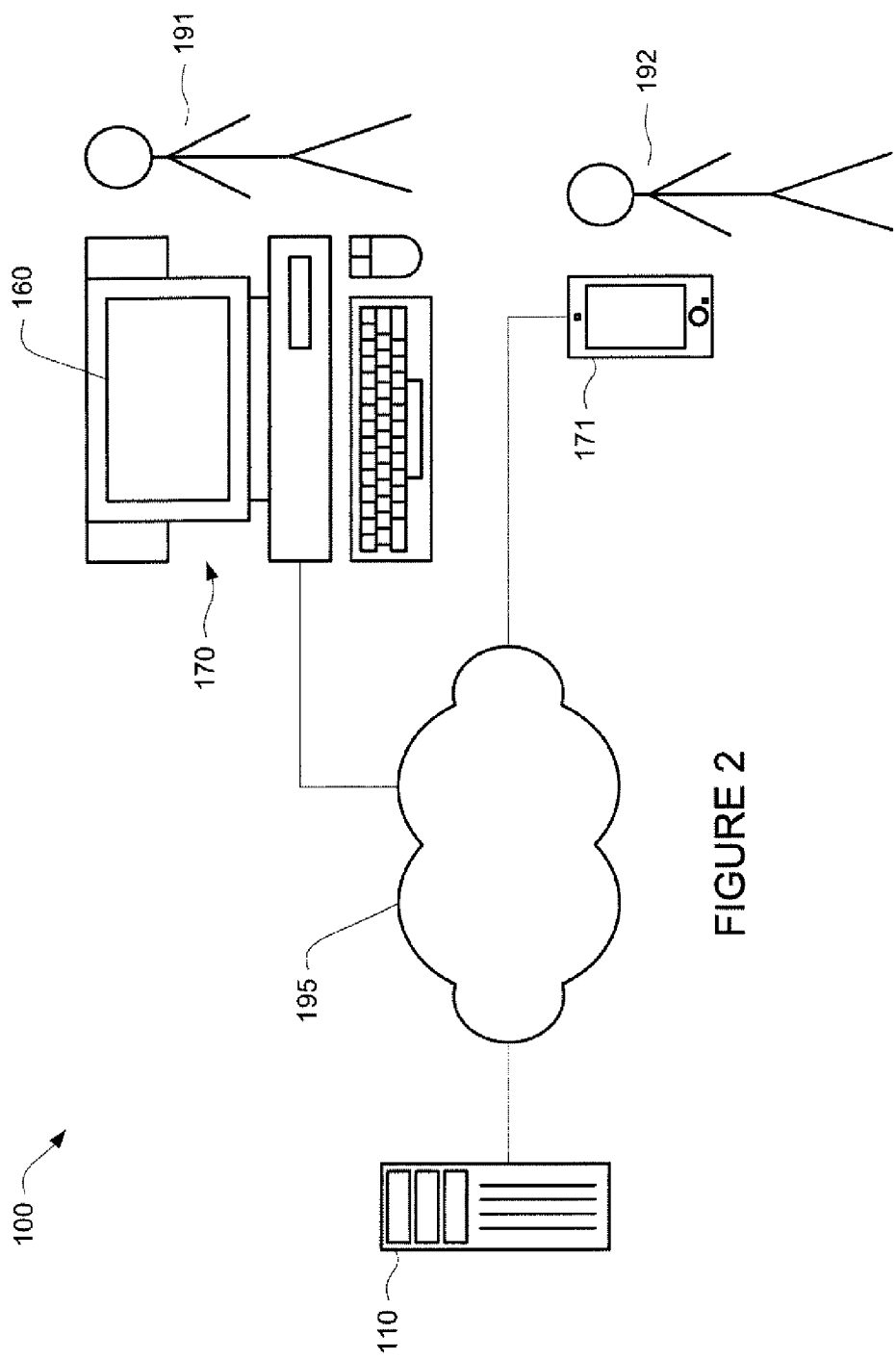
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120. It also includes data 135 that may be retrieved, manipulated or stored by the processor. The memory may be of any type capable of storing information accessible by the processor, including a computer-readable medium such as a hard-drive, memory card, ROM, RAM, DVD, CD-ROM or other optical disks, as well as other write-capable, and read-only memories. The processor 120 may be any well-known processor, such as processors from Intel Corporation or AMD. Alternatively, the processor may be a dedicated controller such as an ASIC.

The instructions 131 may be any set of instructions to be executed directly (such as machine code) or indirectly (such as scripts) by the processor. For example, the instructions may be stored as computer code on the computer-readable medium. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Accordingly, references to a processor or computer will be understood to include references to a collection of processors or computers that may or may not operate in parallel.

In one aspect, computer 110 is a server communicating with one or more client computers 170-71. For example, computer 110 may be a web server. Each client computer may be configured similarly to the server 110, with a processor, memory and instructions 166. Each client computer 170-71 may be a personal computer, intended for use by a person 191-92, having all the internal components normally found in a personal computer such as a central processing unit (CPU), display device 160 (for example, a monitor having a screen, a projector, a touch-screen, a small LCD screen, a television, or another device such as an electrical device that is operable to display information processed by the processor), a computer-readable medium (for example, a CD-ROM, hard-drive, RAM or ROM), user input 162 (for example, a mouse, keyboard, touch-screen or microphone), speakers, modem and/or network interface device (telephone, cable or otherwise) and all of the components used for connecting these elements to one another. Client computer 170-71 may further include a web browser. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client computers 170-71 may comprise a full-sized personal computer, the system and method may also be used in connection with mobile devices capable of wirelessly exchanging data with a server over a network such as the Internet. For example, client computer 171 may be a wireless-enabled PDA such as a Blackberry phone or an Internet-capable cellular phone. In either regard, the user may input information using a small keyboard (in the case of a Blackberry phone), a keypad (in the case of a typical cell phone), a touch screen (in the case of a PDA) or any other means of user input.

The client devices may also include a component, such as circuits, to determine the geographic location and orientation of the device. For example, client device 170 may include a GPS receiver 164 to determine the device's latitude, longitude and altitude position. The component may also comprise software for determining the position of the device based on other signals received at the client device 170, such as signals received at a cell phone's antenna from one or more cell phone towers if the client device is a cell phone. It may also include an accelerometer 165 or gyroscope to determine the direction in which the device is oriented. By way of example only, the device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

The server 110 and client computers 170-71 are capable of direct and indirect communication, such as over a network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Data 150 may be associated with user data 141. User data 141 identifies users of the systems, i.e., any entity that interacts with the system and method such as businesses or people. For example, one user may be the owner of a pizzeria named "Joe's Pizza".

At least some users (hereafter, "advertisers") may be associated with one or more advertisements 145 that the advertiser would like to have rendered to other users. Each advertisement, in turn, may be associated with content (i.e., information that the advertiser has indicated an interest in being rendered to other users) and a search term by which the content is retrieved. For instance, the user "Joe's Pizza" may have stored an advertisement having the text content "Joe's Pizza—great pizza at a great price" and associated the advertisement with the keyword "pizza" or the keywords "Italian food".

Each advertisement may be associated with a price. For ease of explanation, this description may refer to the price as a price-per-click (PPC), i.e., the price that the advertiser is willing to pay each time a user selects the advertisement. However, in lieu of PPC, it will be understood that the system and method may be used in connection with any compensation, such as charging an advertiser each time the content is displayed to a user in response to the user entering in a search term that at least partially matches the advertisement's keyword (e.g., cost-per-view), each time a product or service is subsequently purchased by a user that viewed the advertisement (e.g., cost-per-action) or each time a quantity of qualifying events occur (cost-per-mille). While the system and method may be particularly advantageous when used in connection with advertising, the uses described herein in connection with advertisements may be applied to other types of content as well.

Each advertisement may also identify a node of the network 195 to which a user will be directed in response to selecting the advertisement.

Advertisements may be further associated with geographic locations. For example, as described in more detail below, an advertiser may direct that an advertisement be displayed to users that are located within a particular geographic target area. A geographic target area may be identified in various ways, for example, by city or zip code, distance from a particular location or address, a set of locations (whether the set includes a finite list of discrete and discontinuous locations, or all locations within a defined boundary such as a circle or polygon) and distance along a street or particular route. Other advertisements may not be associated with any particular geographic location.

Advertisements may also be associated with a minimum confidence level. As described in more detail below, an advertiser may request that a particular advertisement be displayed to a user based on the likelihood that a request for information from the user originates from within a particular geographic area.

Data 150 may also include geolocation routines 150 to be used by server 110 to approximate the geographic location of client devices. As described in more detail below, using instructions 140, server 110 may use geolocation routines 150 and extrapolate geographic locations from one or more various types of information received from client devices. For example, server 110 may receive location data from the user device indicating a potential location of the device. Location data may include an exact point, a set of points, a distance from a point, a range of points, a set of points, or arbitrary boundaries, for example streets, cities, zip codes, counties, states or the like. Server 110 may use geographic routines to determine a range of accuracy of the location data and use this information to determine a position or area in which the user device may be located.

For example, server 110 may receive geolocation information from a GPS device or device with GPS capabilities. Thus the device may have access to latitude and longitude information. This information may be received by server 110 during connection with the client device in conformance with communication protocols. For example, the device may use a browser such as Google Chrome or the browser of the Android operating system, each of which may be configured with user permission to send GPS information to trusted network sites (such as www.google.com). Server 110 may use this information to determine a location of the device. Because the accuracy of GPS determinations may depend on the quality of the device and external factors such as environment, the device may further transmit data indicative of accuracy. For example, the client device 170 may inform the server 110 that the transmitted latitude/longitude position is accurate within 100 meters, i.e., the device may be at any location within 100 meters of the transmitted position. The server may also assume a level of accuracy in the absence of such information.

A transmission from a client device may be received by server 110 by way of a wireless telephone base station, such as a cell phone tower. Cell phone tower information may be used to estimate the location of the device. For example, the system may receive the identity of a cell phone tower, or cell ID, from the user device. Based on the geographic location of the cell tower, the system may estimate that the client device may be within a distance of the cell tower such that the cell tower may receive sufficient signal from the client device. Alternatively, the client device may transmit its own location by triangulating its position based on multiple cell phone towers. For example, the device may have an application or browser program which extrapolates location of the client device from the location of cell phone towers near the client device. In some circumstances, determining a location of the device from a cell phone tower may be less accurate than a determination using GPS coordinates. The server 110 may identify the cell phone tower which received the transmission from the client device and, using the geolocation information 150, determine the approximate location of the client device.

Each node on the network may be associated with a network address. For example, each device may be assigned an IP address. An IP address may be expressed as binary numbers or various combinations of numbers, letters, or both. The IP address may be used to determine an approximate location of the device, for example, a city, a neighborhood, or a nearby city or neighborhood. For example, server 110 may determine a geographic location associated with a particular IP address by retrieving the information from a geo-location database. In another example, a geographic location may be determined by comparing an IP address to similar IP addresses which are known to be associated with a location or area. In that regard, determining a location from IP address may be less accurate than a determination using GPS coordinates. During the aforementioned protocols, server 110 may receive network address information and use geolocation information 150 to determine an approximate location of the device.

Figure 20:
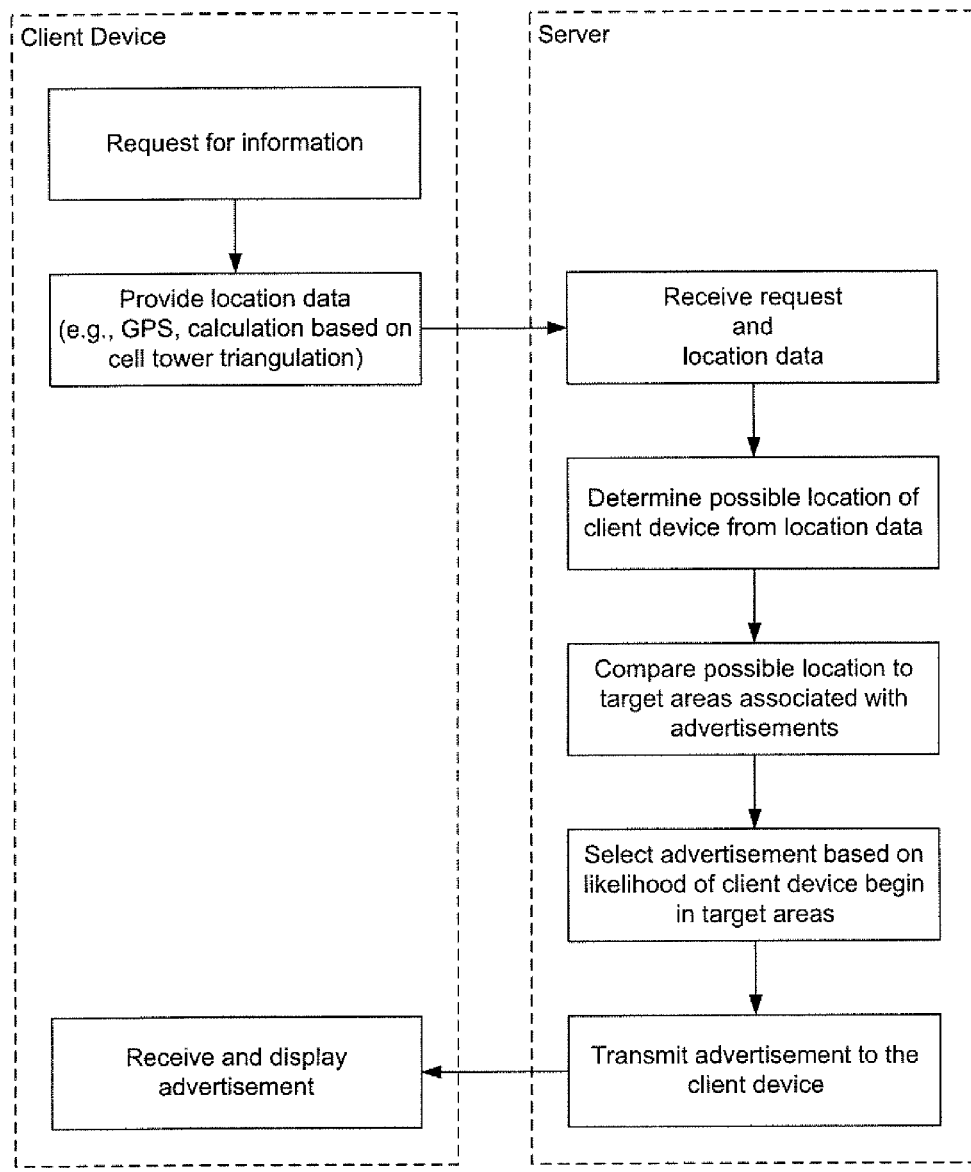
FIG. 20 is a flowchart in accordance with an aspect of the invention.
Figure 21:
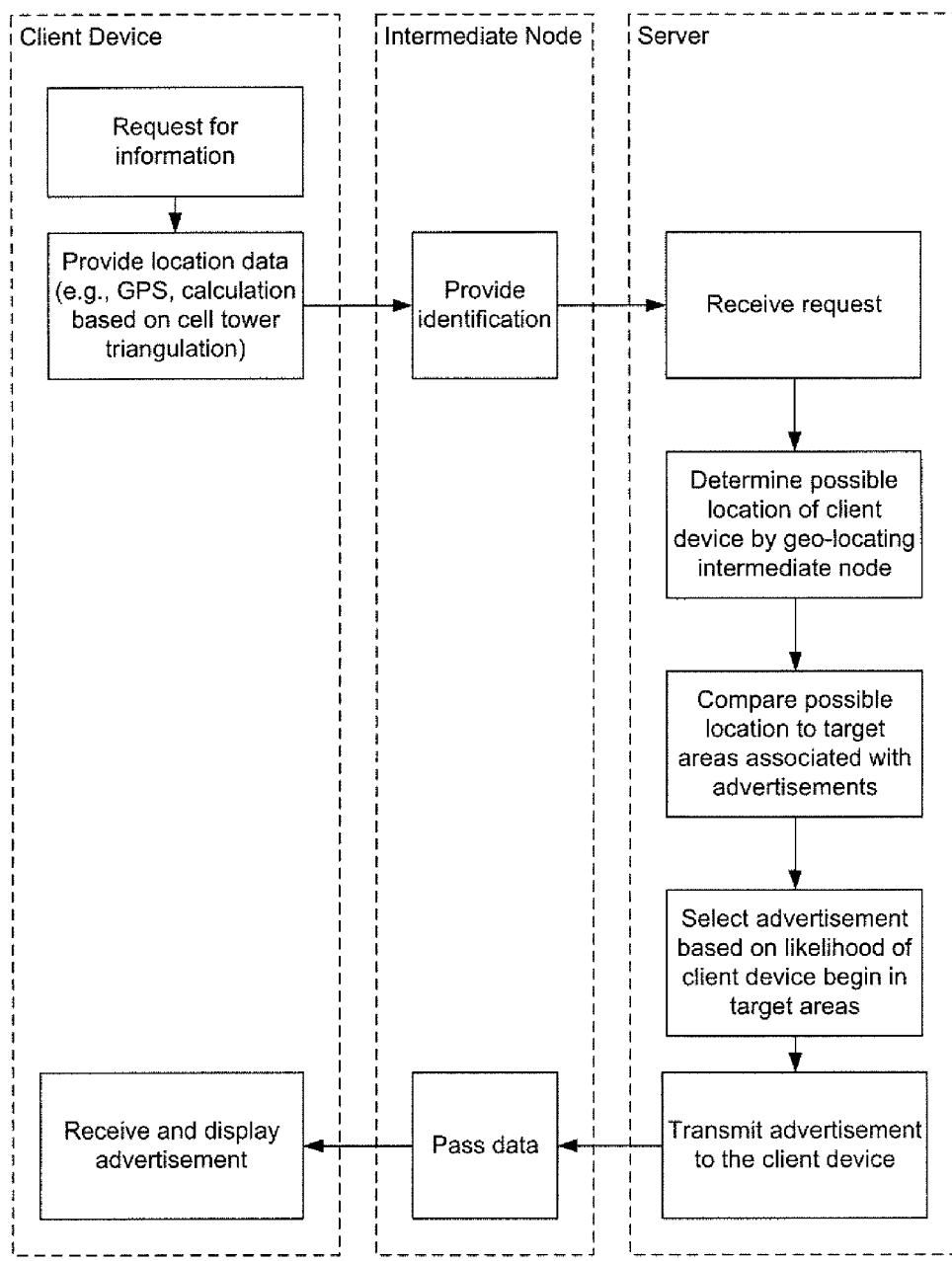
FIG. 21 is a flowchart in accordance with an aspect of the invention.

In addition to the operations illustrated in FIGS. 20-21, various operations in accordance with a variety of aspects of the invention will now be described. It should be understood that the following operations do not have to be performed in the precise order described below. Rather, various steps can be handled in reverse order or simultaneously.

It will be further understood that the sample values, types and configurations of data shown in the figures are for the purposes of illustration only. In that regard, systems and methods in accordance with the present invention may include different data values, types and configurations, and may be provided and received at different times (e.g., via different web pages) and by different entities (e.g., some values may be pre-suggested or provided from different sources).

Figure 3:
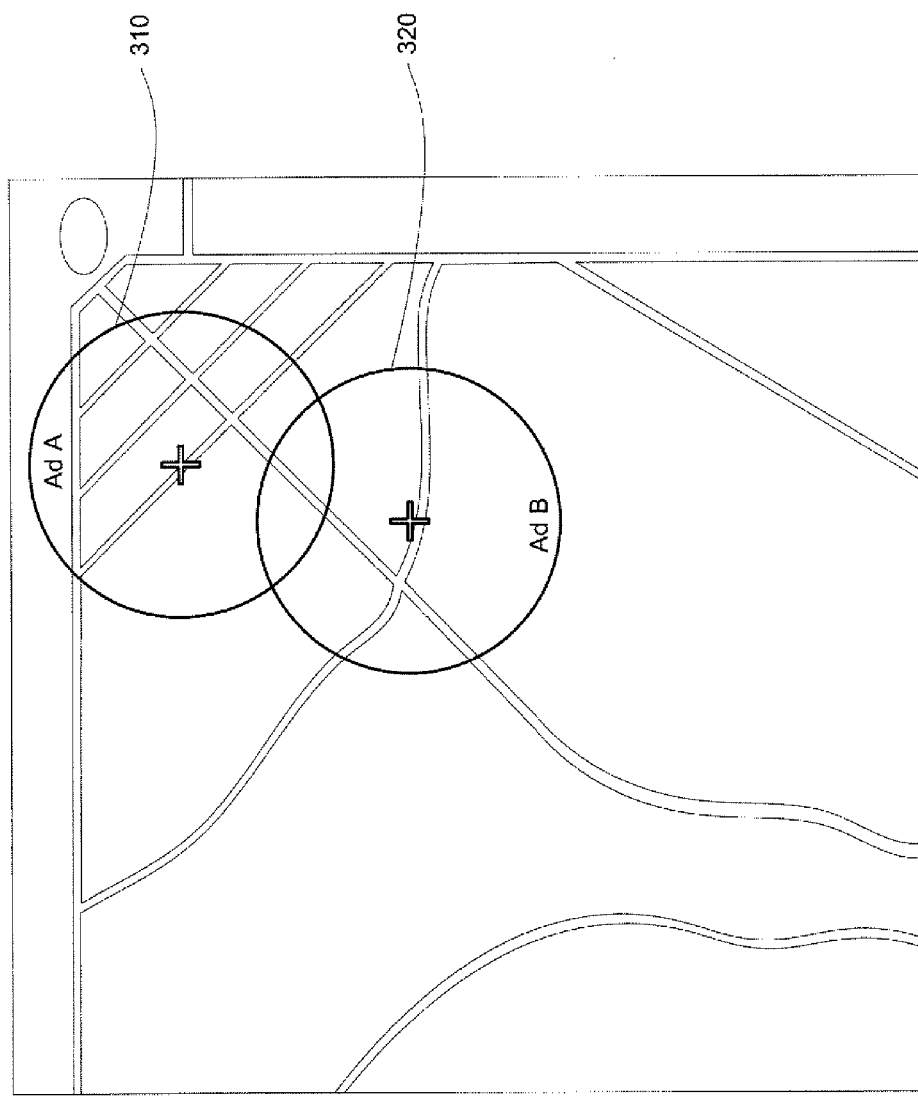
FIG. 3 is a diagram in accordance with an aspect of the invention.

As shown in FIG. 3, the system and method may include advertisements associated with geographic areas. In that regard, Advertisements A and B may be associated with a geographic target area 310, 320. In the example, Advertisement A's geographic target area 310 overlaps with the geographic target area 320 of Advertisement B. In the figure, the geographic areas of both advertisements are defined by circles superimposed on a map, however, it will be understood that FIG. 3 is merely a visual representation of information and accordingly, the geographic target area may be defined in various ways. As explained above, the advertisements may be further associated with users, content, keywords, and other information. For example, Advertisement A may be associated with a user "Joe's Pizza" while Advertisement B may be associated with a user "Tom's Italian Restaurant." The advertisements may also be associated with the same or different keywords. In the example, both advertisements may be associated with the keyword, "pizza".

Figure 4:
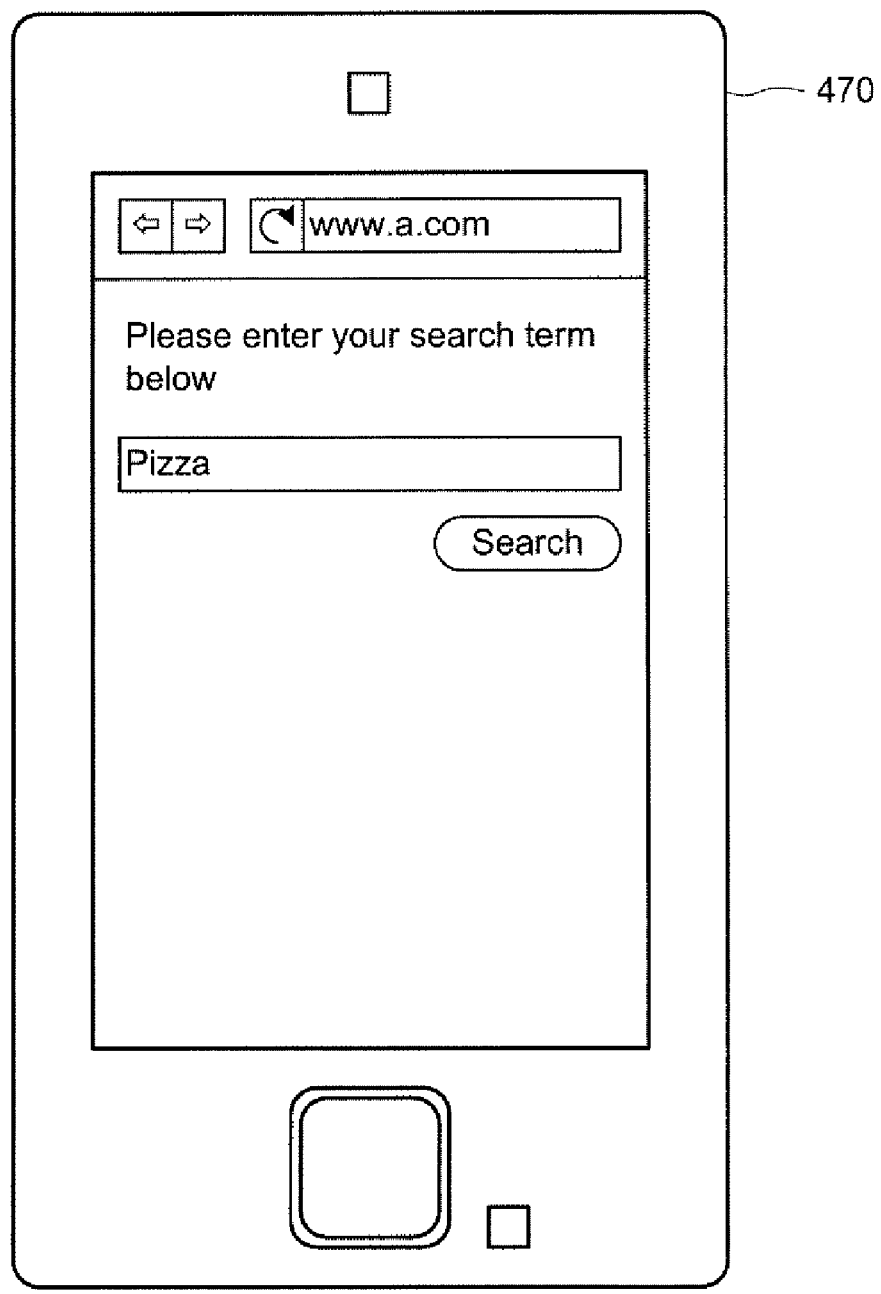
FIG. 4 is a client device in accordance with an aspect of the invention.

As shown in FIG. 4, a user 191 may send a request for information from a client device 470. For example, the request may be in the form of a search request using a search term such as "pizza". The user may enter or select the search term and submit the request.

Figure 5:
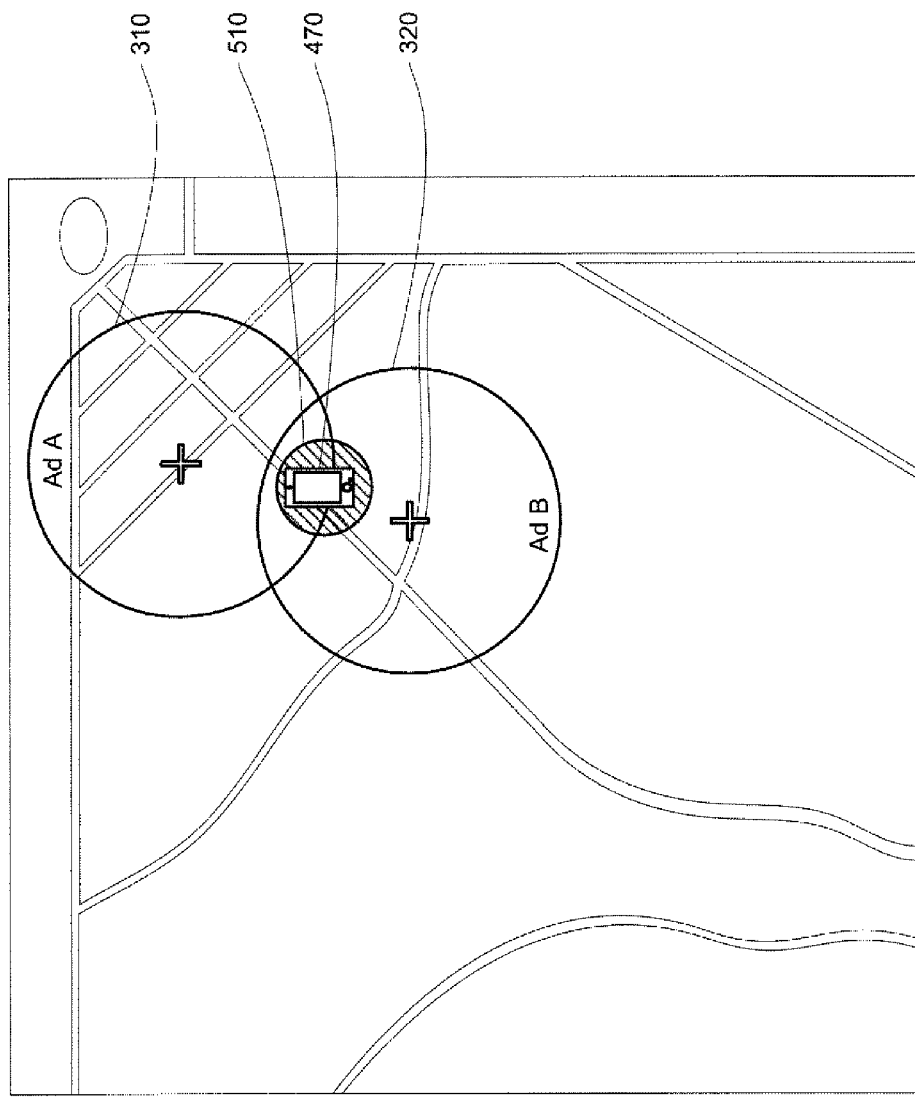
FIG. 5 is a diagram in accordance with an aspect of the invention.

Upon receipt of the request for information, a server may determine a geographic area associated with the location of the device that sent the request. As shown in FIG. 5, the client device 470 may be a GPS device or a device with GPS capabilities, such as GPS-enabled cell phone. Server 110 may receive latitude and longitude information from the GPS. The GPS information allows the server 110 to determine, to a high degree of accuracy, a geographic area 510 from which the request came. In the example, server 110 may determine that client device 470 is within the geographic area 510.

Figure 6B:
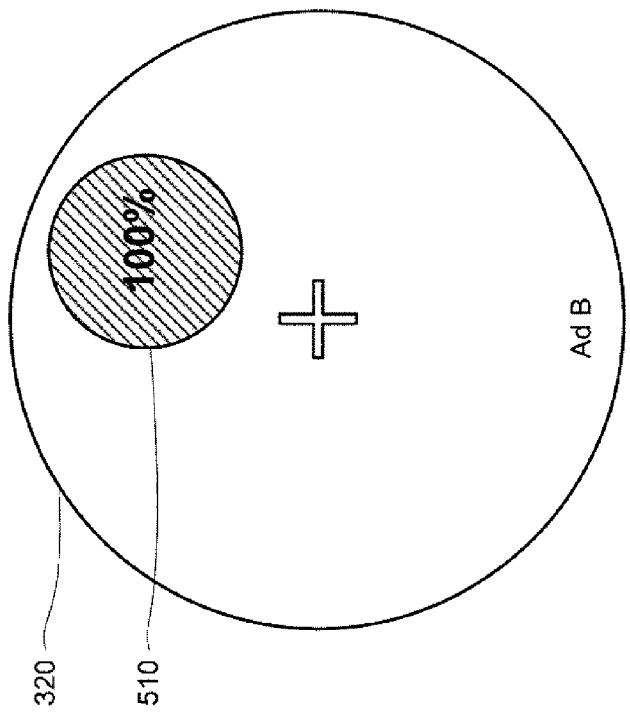
FIGS. 6A and 6B are diagrams in accordance with aspects of the invention.
Figure 6A:
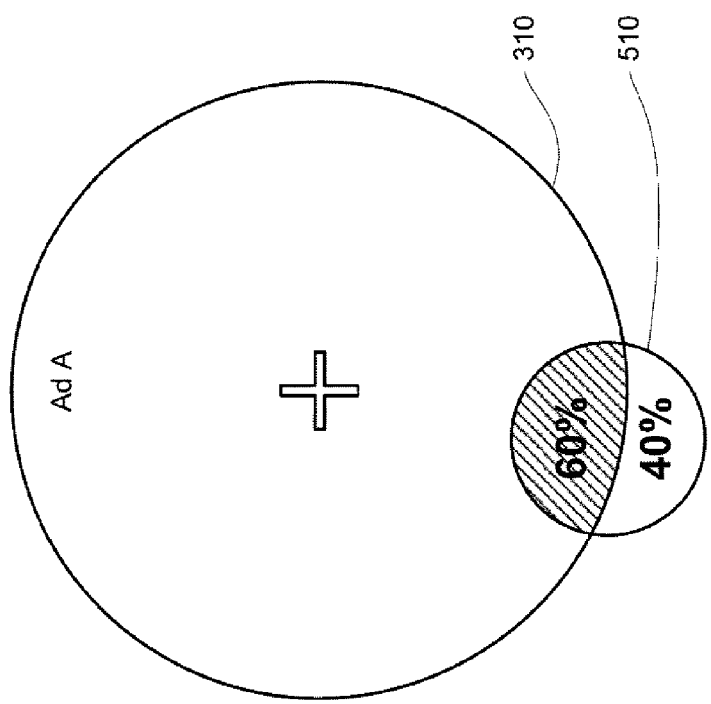

The server 110 may compare the geographic area in which the client device is expected to be located to the geographic target areas associated with one or more advertisements. As shown in more detail in FIGS. 6A and 6B, geographic area 510 overlaps with the geographic target areas 310, 320 of Advertisements A and B. In the example, client device 470 is 60% likely to be within geographic target area 310 of Advertisement A, and 40% likely to be outside of the target area, because approximately 60% of the device's geographic area 510 lies within the advertisement's target area (and further assuming that the likelihood of the device being at any given point within area 510 is equal to the likelihood of the device being at any other point within area 510). Client device 470 is 100% likely to be within geographic target area 320 of Advertisement B. Although in the example likelihood is shown to be 100%, it will be appreciated that because of approximations and calculations involved in determining geographic locations, actual likelihoods may be approximated and somewhat less than 100%.

Figure 7:
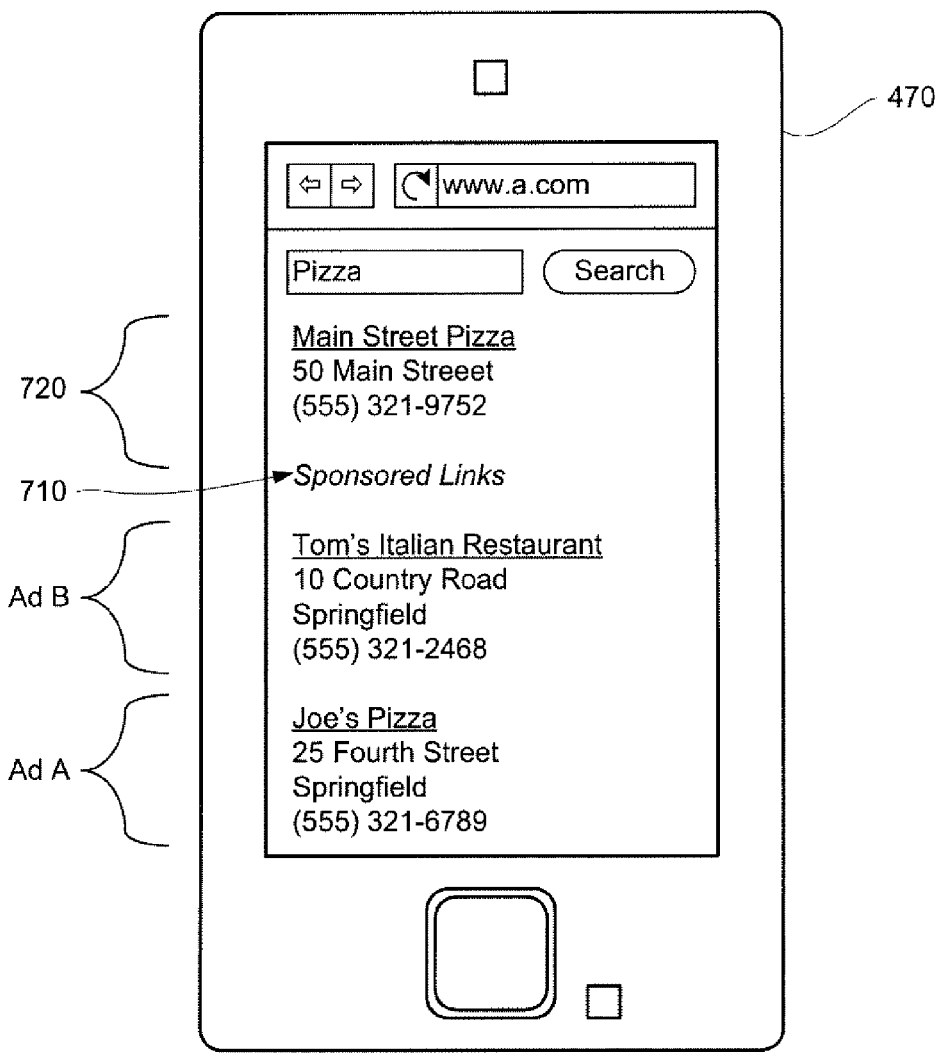
FIG. 7 is a client device in accordance with an aspect of the invention.

The server 110 may select advertisements for display on client device 470 based on the likelihood of the client device being within the geographic target areas. For example, the likelihood that client device 470 is within a geographic target area 310 of Advertisement B is greater than the likelihood that the client device is within geographic target area 320 of Advertisement A. Accordingly, server 110 may send only Advertisement B to client device 470, or may send both Advertisements A and B with an indication that Advertisement B is to be displayed above Advertisement A. As shown in FIG. 7, client device 470 displays both Advertisement A and Advertisement B as sponsored links 710 with Advertisement A being placed above Advertisement B on the display. Client device 470 may also display additional search results 720 which may not be sponsored links.

Figure 8:
FIG. 8 is a client device in accordance with an aspect of the invention.

In another example, the request for information may come from a GPS device requesting a map of its current location from server 110. Server 100 may display the advertisement on the client device 470 as a location on a map. As described above, server 110 may determine that the likelihood that client device 470 is within the geographic target area of Advertisement B is greater than the likelihood that the client device is within the geographic target area of Advertisement A. Accordingly, server 110 may send Advertisement B to client device 470 for display, for example, as shown in FIG. 8.

Figure 9:
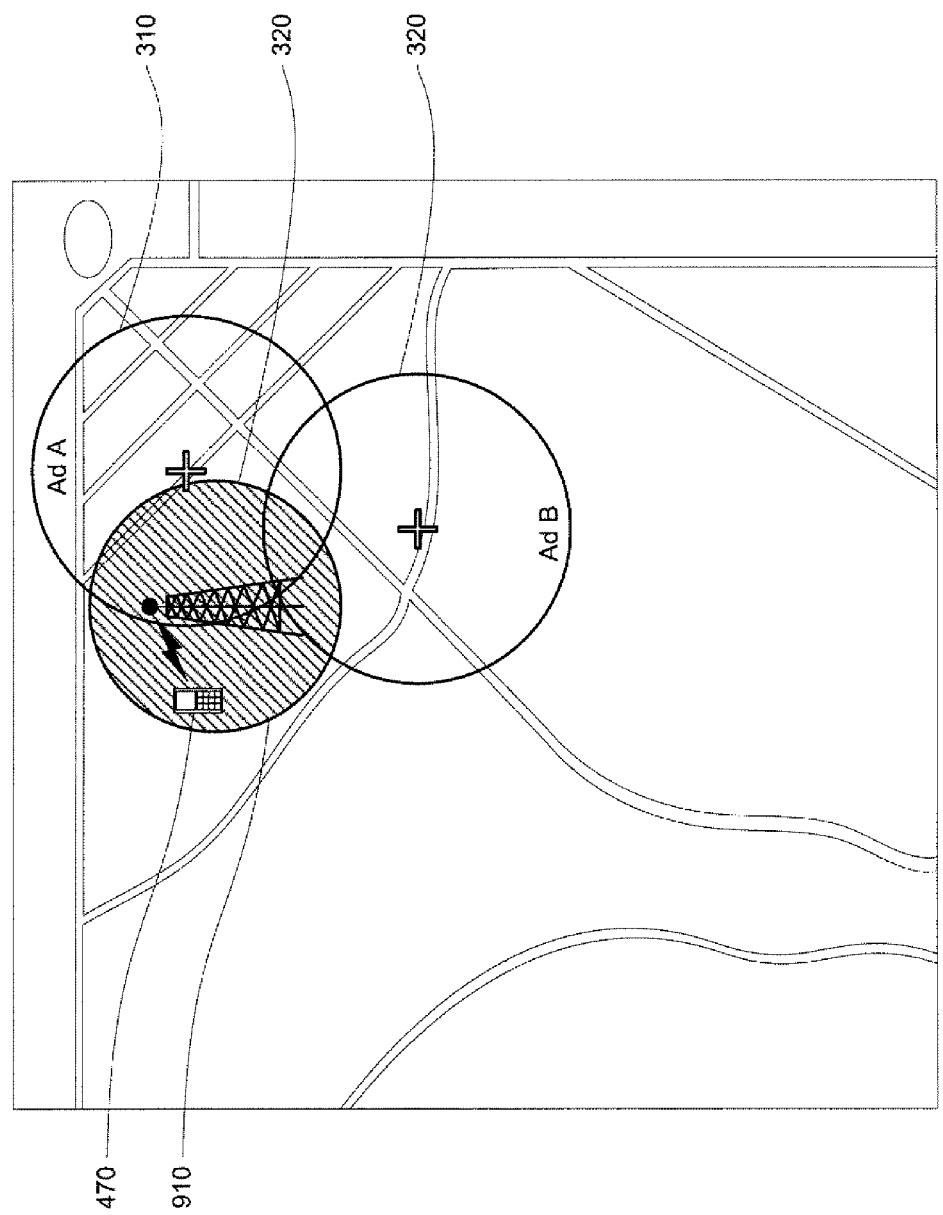
FIG. 9 is a diagram in accordance with an aspect of the invention.

As shown in FIG. 9, a request for information from a client device may be associated with a transmission from a cell phone tower. For example, the client device may be a cell phone 470 in wireless communication with the cell tower illustrated in the figure. Server 110 may use the information regarding the cell phone tower to approximate a geographic area from which the request may have originated. In the example, server 110 may determine that the request originated from geographic area 910. In this regard, the geographic area 910 of the example of FIG. 9 may be larger than the geographic area in the example of FIG. 5, indicating a lesser degree of accuracy when using cell phone tower information as opposed to using GPS latitude and longitude information. When using GPS information, the system may receive latitude and longitude determined by the GPS instrumentation on the client device, whereas when using cell tower information, the system may determine location based on information regarding the range of a cell tower proximate to the client device and which may not be information from the client device itself.

Figure 10:
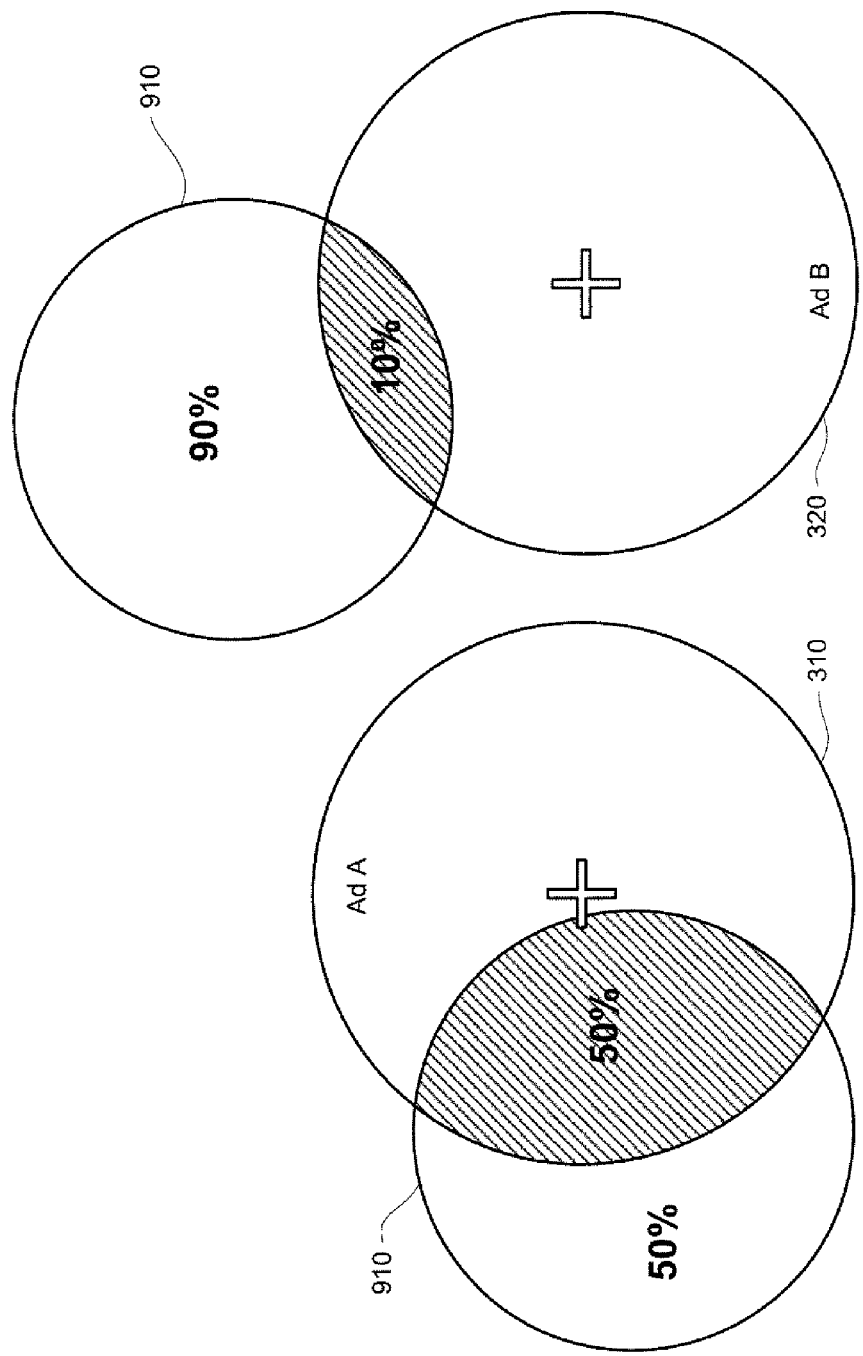
FIGS. 10A and 10B are diagrams in accordance with aspects of the invention.

Server 110 may compare the geographic area 910 of the request with the geographic target areas 310 and 320 of Advertisements A and B. As shown in FIGS. 10A and 10B, the request is more likely to have originated from within geographic target area 310 of Advertisement A than geographic target area 320 of Advertisement B. That is because, as shown in FIG. 9, there is a 50% versus 10% likelihood that the client device is present within Advertisement A's versus Advertisement B's target area. Accordingly, server 110 may send Advertisement A to the requesting device.

Server 110 may determined a geographic area of a request based on an IP address of the client device. The IP address may be associated with the client device or an intermediate network device, for example, a wired or wireless router. Server 110 may determine a geographic location or area associated with the IP address as described above.

Figure 11:
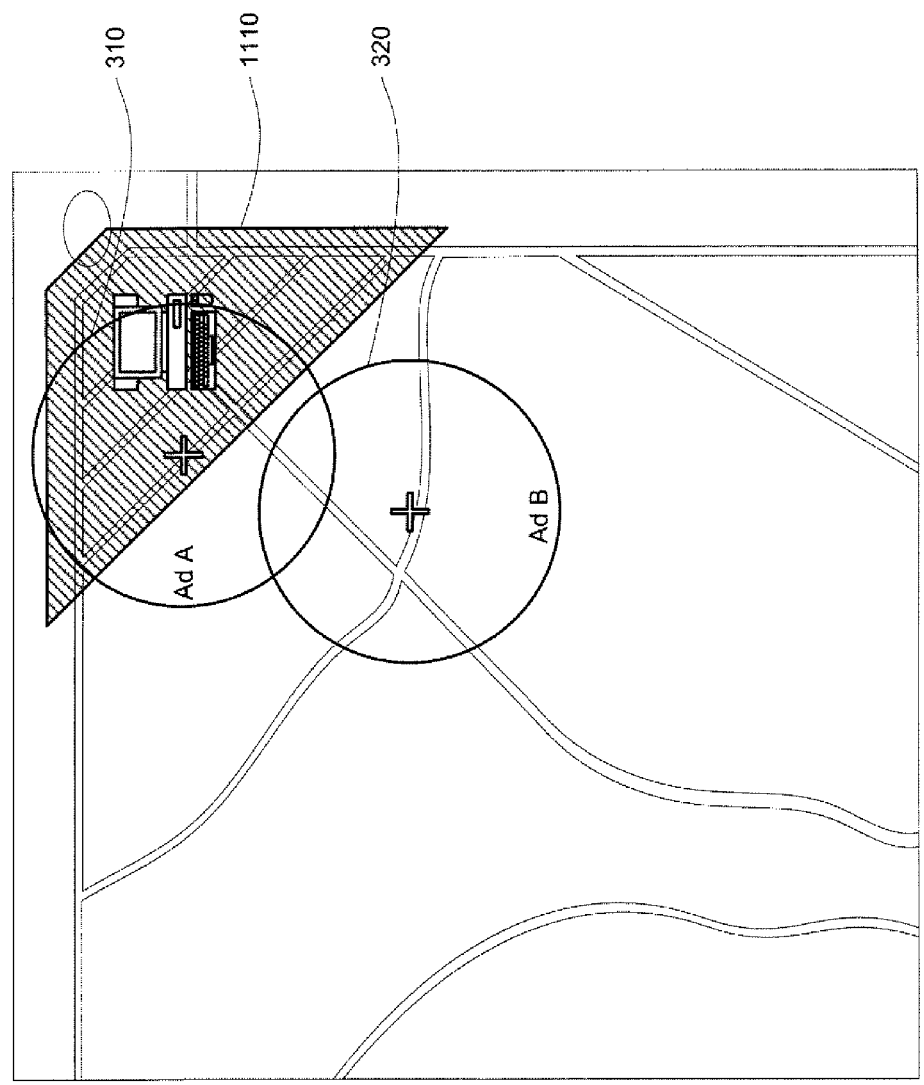
FIG. 11 is a diagram in accordance with one aspect of the invention.

As shown in FIG. 11, geographic area 1110 may be greater than geographic areas 510 of FIG. 5 indicating that it may be more difficult to determine the actual location of client device based on IP address than GPS information. As described above, server 110 may compare geographic area 1110 with the geographic target areas 310, 320 to determine what information to send to the client device.

Figure 12:
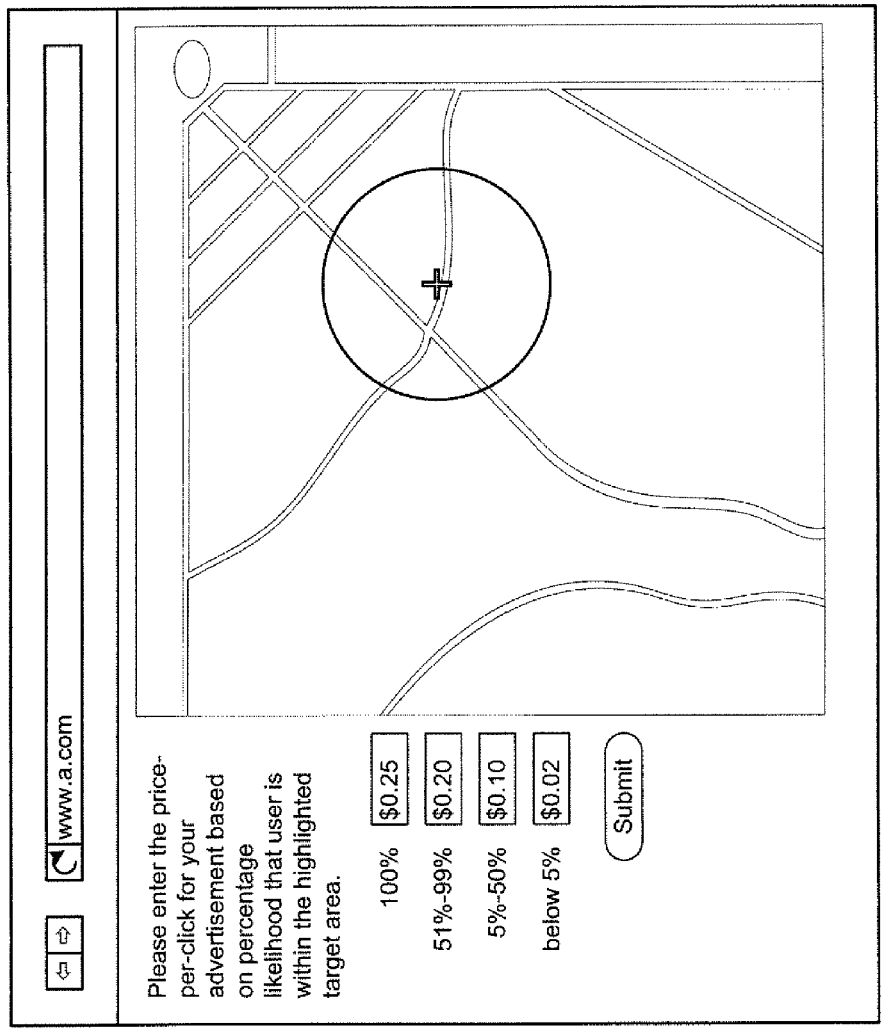
FIG. 12 is screen shot in accordance with an aspect of the invention.

An advertiser may select the price that is willing to pay for the advertisement based on the likelihood of the client device being within the advertisement's target area. As shown in FIG. 12, the greater the odds of the client device being within the target area at the time of the request, the greater the likelihood that the advertiser is willing to pay a higher PPC.

Rather than indicating precise percentages that correspond the odds of the client device being within the area, the system and method may also use other indications. For example, the system may provide a descriptive scale such as "very certain," "more likely than not", "small likelihood," and "no likelihood."

Figure 13:
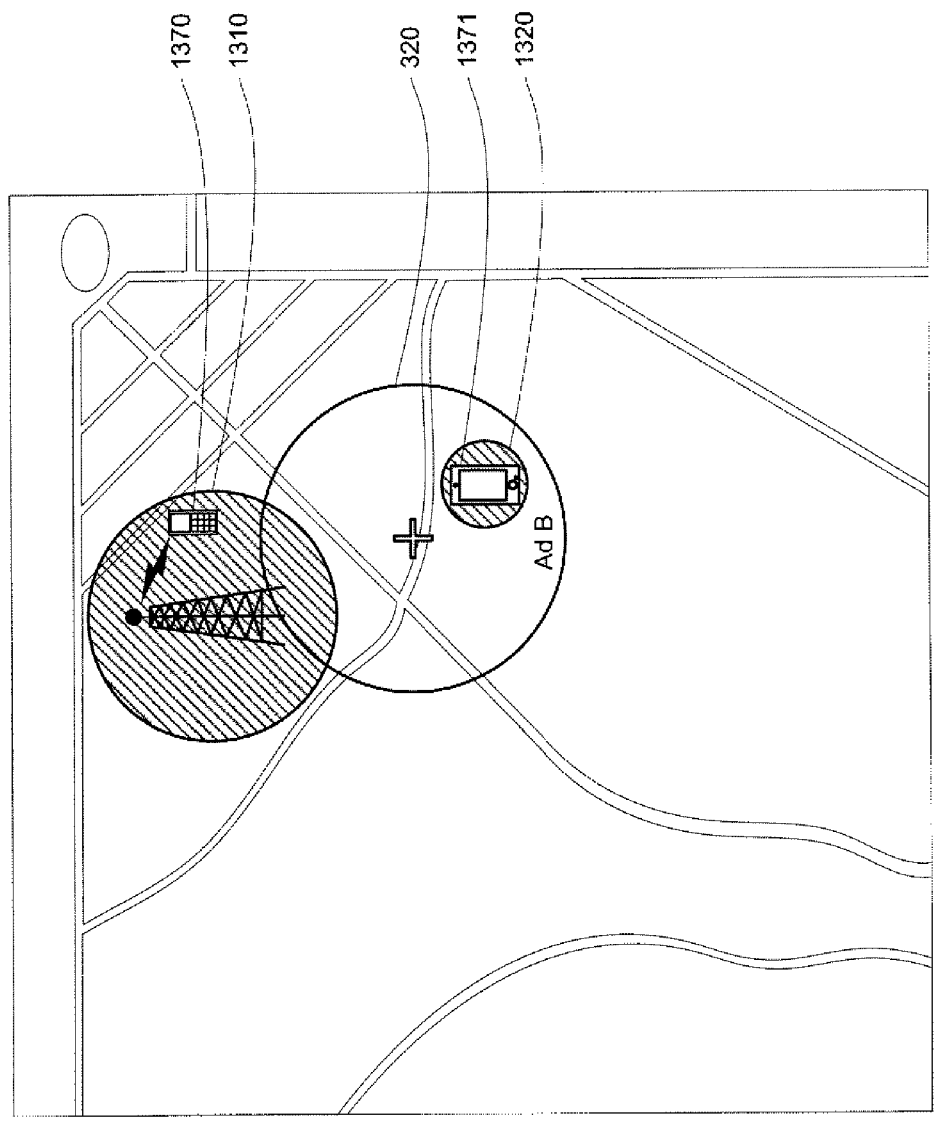
FIG. 13 is a diagram in accordance with an aspect of the invention.
Figure 14:
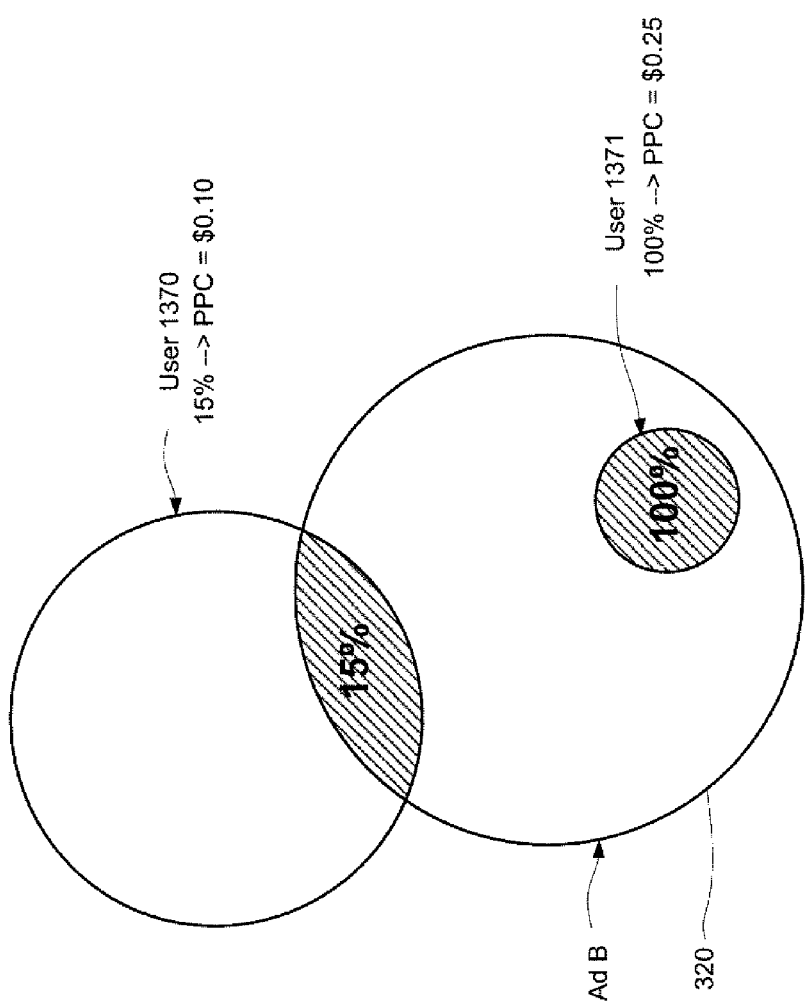
FIG. 14 is a diagram in accordance with an aspect of the invention.

Once the PPC for various likelihoods has been determined, server 110 may charge the advertisers different prices based on the likelihood that a client device in within a particular geographic area. As shown in FIG. 13, both client devices 1370, 1371 may be associated with geographic areas 1310, 1320. As indicated above, the geographic area associated with device 1370 may be larger than the geographic area associated with device 1371 because of the accuracy of the information, for example, cell phone tower or GPS, used to determine the geographic area. As shown in FIG. 14, client device 1370 is 15% likely to be within geographic target area 320 of Advertisement B while client device 1371 is 100% likely to be within the geographic target area of Advertisement B. Accordingly, server 110 may charge Tom's Italian Restaurant $0.10 per click if selected by the user of client device 1370 and $0.25 per click if selected by the user of client device 1371.

Figure 15:
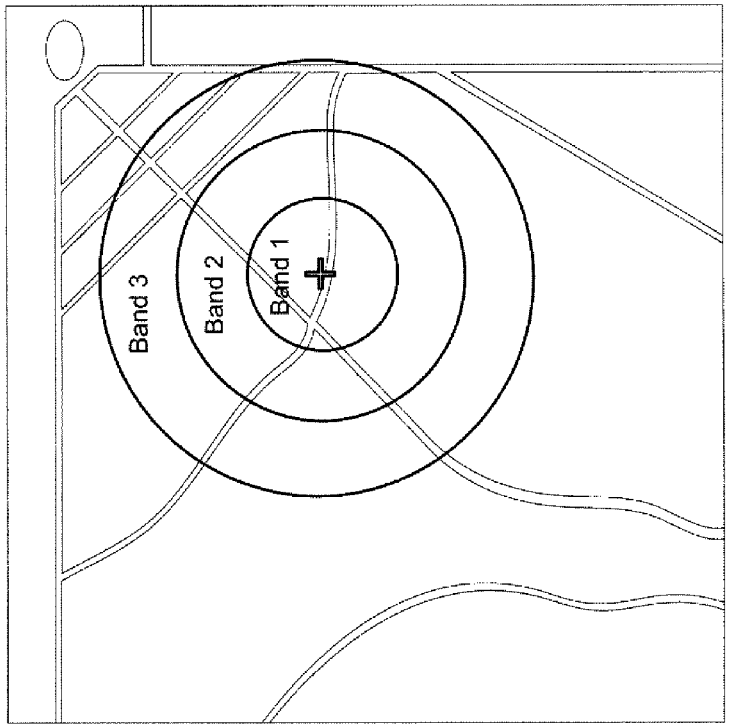
FIG. 15 is screen shot in accordance with an aspect of the invention.

As shown in FIG. 15, an advertiser may also bid a price based on the client device's likely distance from the advertiser's business location or some other location. Distances from the business may be represented by bands on a map. For example, Band 1 may have a radius of 1 mile, Band 2 may have a radius of 2 miles, Band 3 may have a radius of 3 miles, and so on. If a client device is more likely to be located within a band of a smaller radius, the advertiser may be willing to pay a greater PPC than if the client device is closer to its business than farther away. The reverse may also be true. For example, a business with several locations within a particular geographic area may be willing to pay a greater price per click when a client device is located within a general area as opposed to when the client device may be located proximate to a particular point or location.

Figure 16:
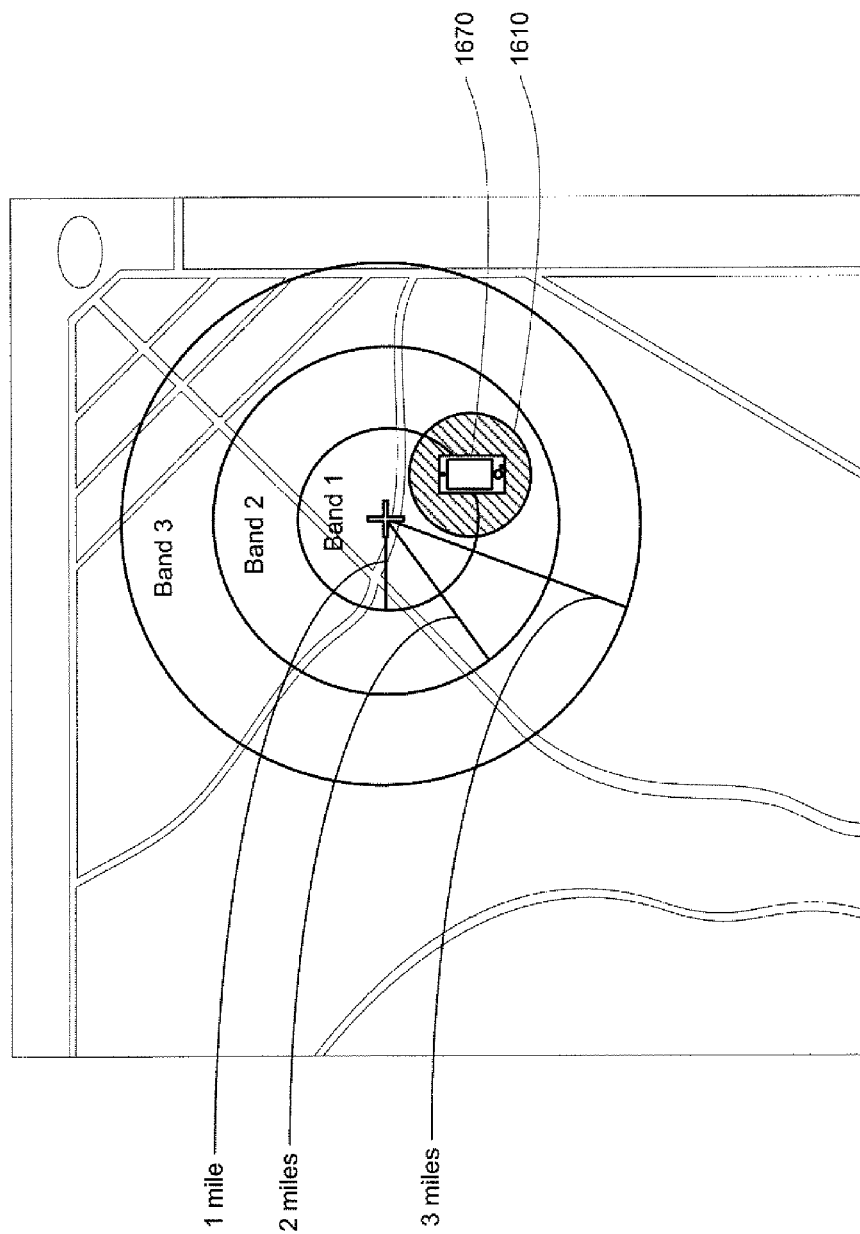
FIG. 16 is a diagram in accordance with an aspect of the invention.
Figure 17:
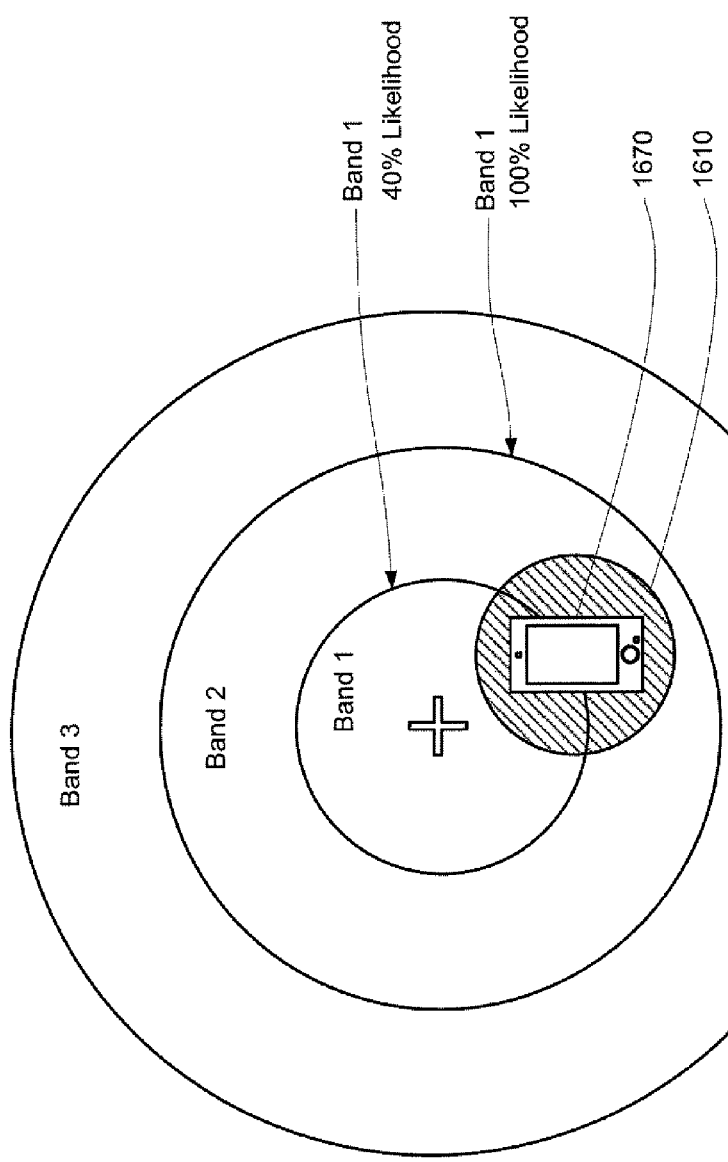
FIG. 17 is a diagram in accordance with an aspect of the invention.

As shown in FIG. 16, a request from a client device may be associated with a geographic area which overlaps with one or more bands. For example, a request from client device 1670 may be associated with geographic area 1610 which overlaps with both Bands 1 and 2. As shown in FIG. 17, the client device may be 40% likely to be within a 1 mile radius of the business and 100% likely to be within a 2 mile radius of the business. Server 110 may thus determine that the user device is more likely to be located farther than 1 mile than less than 1 mile. Accordingly, server 110 may determine that the client device is within a 2 mile radius for billing purposes. In another example, server 110 may determine that some percentage less than 100% likelihood is sufficient to assume that client device 1670 is within band 1 for billing purposes.

One of the advantages of the invention is its ability to accommodate a wide variety of alternatives and additions to the foregoing features.

In one alternative, an advertiser may select a price for display or use of an advertisement based on the accuracy of location information from a user device in addition to the location of the client device. For example, advertisers may bid for advertisements to be displayed where location information from a user device is more or less accurate. As noted above, GPS location information is likely to be more accurate than location information based on a cell tower or IP address.

Advertisers may select keyword and location accuracy pairs associated with geographic locations. For example, Joe's Pizza may only deliver within a specified distance of the business. Joe's Pizza may wish to bid on the keyword "pizza" within delivery range of the business. Accordingly, Joe's Pizza may want to bid or submit a price for advertisements to be displayed to client devices which provide location information of higher accuracy. This approach may increase the likelihood that the advertisement will be displayed within the selected area. In another example, if Joe's Pizza has multiple restaurants within a geographic area, Joe's Pizza may wish to bid on the keyword "pizza" within the geographic area, but Joe's Pizza may also wish to bid for advertisements to be displayed to client devices which provide lower accuracy information. This approach may be useful where the advertiser is less interested in location accuracy, but more interested in reaching a greater number of users.

Where advertisers select prices based on the accuracy of the location information provided by a client device, the accuracy may be expressed in various levels. For example, the accuracy may be represented by stages or levels, such as low, medium, high. In another example, location accuracy may be a continuous variable, for example with values ranging from "0" to "1," where "0" represents the lowest possible accuracy and "1" represents the highest possible accuracy.

Figure 18:
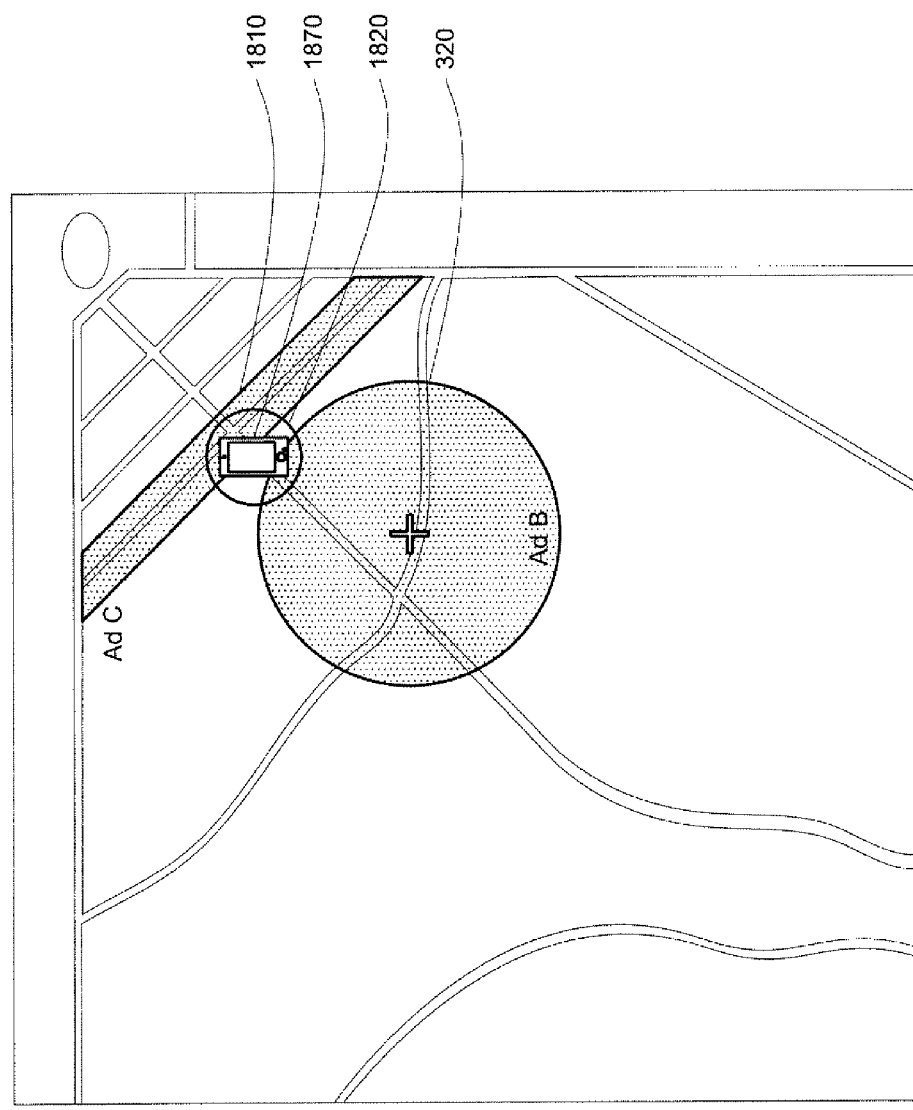
FIG. 18 is a diagram in accordance with an aspect of the invention.
Figures 19A, 19B:
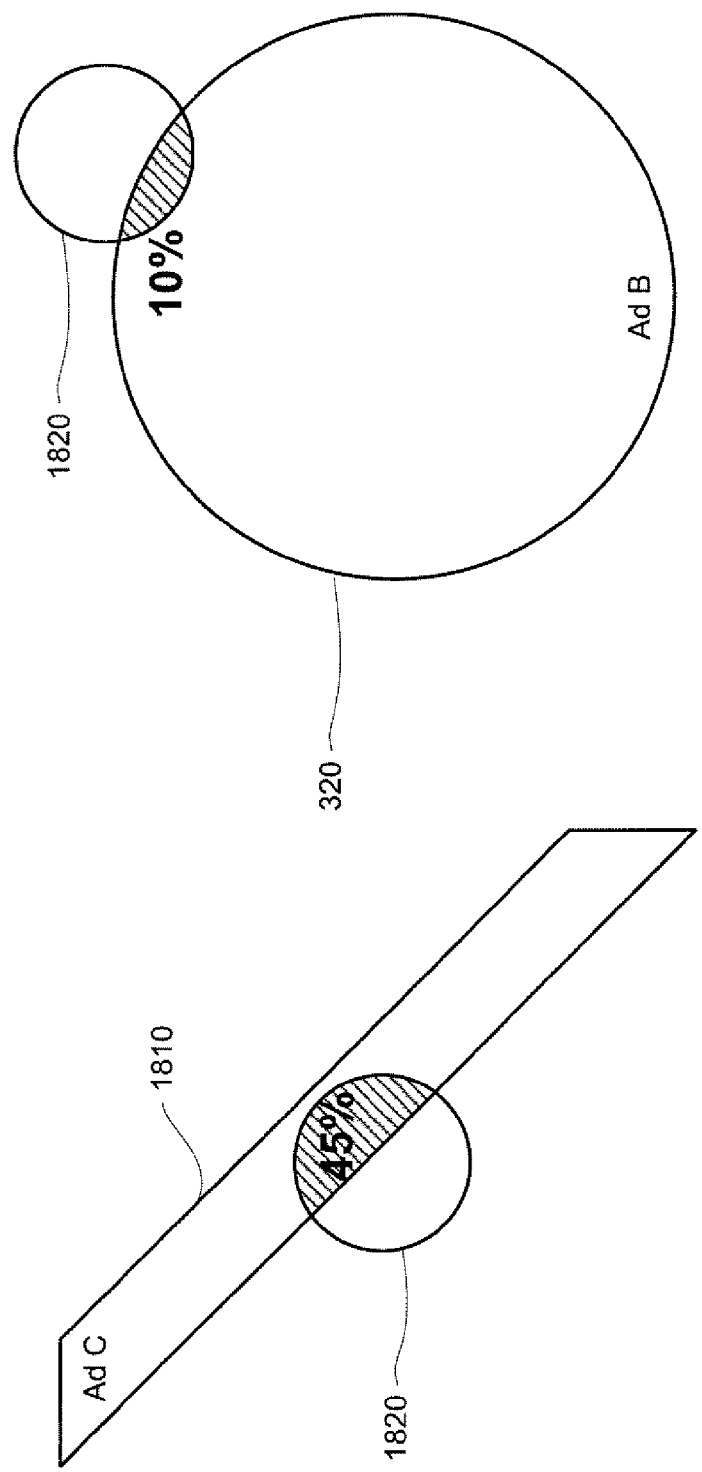
FIGS. 19A and 19B are diagrams in accordance with aspects of the invention.

Geographic target areas may be defined in various ways. For example, as described above, geographic target areas may be associated with a particular radius from a given location. Target areas may also be defined by streets, city names, counties, and the like. In another example, shown in FIG. 18, geographic target area 1810 of ad C may be defined as a distance from a particular street or business route, such as, for example, the delivery area of a pizza shop. As shown in FIGS. 19A and 19B, the system and method may determine the geographic area 1820 of the client device, and may determine the likelihood that a user request from the client device originated from within the target area 1810 or target area 1820. Server 110 may thus rank and select the advertisement to send as explained above.

In some aspects, and regardless of an advertisement's target area, the location information sent by a client device may indicate that the device is potentially at many locations, but the device is more likely to be at some locations than others. For instance, the device may transmit information indicating that the likelihood of the device being at a particular location proximate to the transmitted location decreases exponentially with distance, e.g., the device is far more likely to be within 10 meters of the transmitted location than 20 meters. The system may use this information when calculating the amount of overlap or intersection between, on the one hand, the possible locations at which the device may be and, on the other hand, the locations defined by the target area.

The price paid for an advertisement may also be selected based on the time of day in combination with the geographic area of the client device. For example, the operator of a restaurant may determine that customers are more willing to travel shorter distances during lunch time than dinner time. Accordingly, the advertiser may be willing to pay a higher PPC for advertisements selected by individuals who are within 1 mile or less during the hours from 11:00 am to 12:30 pm. In the same respect, the restaurant may determine that individuals are more likely to travel longer distances for dinner. Therefore, the distance from the restaurant during the evening hours may be less important. Accordingly, "Joe's Pizza" may be willing to pay a higher PPC for advertisements selected by individuals who are within 10 miles or less during the afternoon and evening hours.

In other aspects, functions described above as being performed by the server may be performed by the client device, and vice versa. For example, the client device may determine which advertisements to display based on the geographic area of the client device. In yet more aspects, the client device and server perform and share different functions.

It will be understood that references herein to "search term" may include search terms that include more than one word, i.e., a search term may comprise multiple words. It will be similarly understood that when a search query contains a search term (e.g. "pizza"), the query may contain only that one term or multiple terms (e.g., "pizza in Springfield").

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of providing an advertisement to a client device, wherein the advertisement is one of a plurality of advertisements, the method comprising:
   receiving a request for information from a client device, the request including geographic information associated with the client device, the geographic information associated with an accuracy level;
   selecting an advertisement from the plurality of advertisements based on the request for information and the accuracy level of the received geographic information; and
   transmitting, to the client device, the selected advertisement.

2. The method of claim 1, further comprising:
   receiving an advertiser bid specifying a keyword and a first accuracy level;
   wherein selecting an advertisement based on the request and the accuracy level includes comparing the specified keyword with the request for information and comparing the first accuracy level with the accuracy level of the received geographic information.

3. The method of claim 2, wherein receiving an advertiser bid specifying a keyword and a first accuracy level includes receiving an advertiser selection of the first accuracy level from a plurality of predetermined accuracy levels.

4. The method of claim 3, wherein the plurality of predetermined accuracy levels includes a range of different accuracy levels.

5. The method of claim 1, wherein selecting an advertisement includes comparing the received geographic information with a geographic target area associated with the advertisement.

6. The method of claim 1, wherein the accuracy level of the geographic information is associated with a location determination technology from which the geographic information is derived.

7. A method of providing an advertisement to a device, wherein the advertisement is one of a plurality of advertisements, each advertisement associated with a target set of geographic locations, and, the method comprising:
   receiving a request for information from a device;
   receiving location data based on a geographic location of the device at the time of the request;
   determining a potential location set, where the potential location set comprises a set of geographic locations at which the device may be located, and wherein the potential location set is determined based on the location data;
   determining, for each advertisement, a likelihood value based on the likelihood that the device is at a geographic location that is within both the potential location set and the target set;
   selecting an advertisement from the plurality of advertisements based on the amount of the likelihood value; and
   providing the advertisement to the device.

8. The method of claim 7, wherein receiving the location data comprises receiving latitude/longitude information and wherein determining the potential location set comprises determining a geographic area based on the accuracy of the latitude/longitude data relative to the actual location of the device.

9. The method of claim 8, wherein the location data is latitude/longitude information from a GPS.

10. The method of claim 7, wherein receiving the location data comprises receiving a geographic location of a wireless receiver in communication with the device and wherein determining the potential location set comprises determining an area based on a broadcast range of the device.

11. The method of claim 10, wherein the wireless receiver comprises a wireless telephone base station.

12. The method of claim 7, wherein receiving the location data comprises receiving the IP address of an intermediate device at a node of a network that received the request from the device and wherein determining the potential location set comprises determining a geographic area that includes the geographic location of the intermediate device.

13. The method of claim 12, wherein the intermediate device is a router.

14. The method of claim 12, wherein the intermediate device is a wireless router.

15. The method of claim 7, wherein the received location data identifies the potential location set.

16. The method of claim 15, wherein the received location data comprises a latitude/longitude location determined by the device and a range based on the accuracy of the determined location.

17. The method of claim 7, wherein, for at least one advertisement, the likelihood value indicates that at least one location is within both the potential location set and the target set and at least one location is within the potential location set but not the target set.

18. The method of claim 7, wherein the likelihood value represents the extent of an intersection between the locations of the potential location set with the target set.

19. A system for providing and displaying an advertisement comprising:
   a first computer at a first node of a network;
   the first computer having access to a set of instructions for execution by the first computer and having access to advertisements, each advertisement associated with a target set of geographic locations; and
   a client device at a second node of the network different from the first node, the client device comprising a user input device, an electronic display, a processor and instructions for execution by the processor;
   the instructions of the first computer comprising:
      receiving a request for information from the client device, wherein the request includes location data;
      determining a potential location set comprising a set of geographic locations at which the device may be located at the time of the request, and wherein the potential location set is determined based on the location data;
      determining, for each advertisement, a likelihood value based on the likelihood that the device is at a geographic location that is within the both the potential location set and the target set;
      selecting an advertisement from the plurality of advertisements based on the likelihood value; and
      transmitting the selected advertisement to the client device over the network;
   the instructions of the client device comprising:
      transmitting a request for information to the first computer; and
      displaying, on the electronic display, the selected advertisement transmitted by the first computer.

20. The system of claim 19, wherein the first computer is a web server.

21. The system of claim 19, wherein the client device is a mobile phone.

22. The system of claim 19, wherein the client device is a personal computer.

23. A computer-usable recording medium recorded with a program for use by a computing device, the program comprising:
   computer code that receives a request for information from a mobile device;
   computer code that determines a geographic source of the request; computer code that accesses a plurality of advertisements, each advertisement associated with a geographic target area;
   computer code that determines an amount of overlap between the geographic source of the request and the geographic target areas of the plurality of advertisements;
   computer code that selects an advertisement from the plurality of advertisements based on the amount of overlap; and
   computer code that transmits the selected advertisement.

24. The computer-usable recording medium of claim 23, wherein the geographic source of the request is determined from geographic information associated with the request.

25. The computer-usable recording medium of claim 24, wherein the geographic information includes latitude/longitude from a GPS.

26. The computer-usable recording medium of claim 24, wherein the geographic information includes the identity of a wireless receiver.

27. The computer-usable recording medium of claim 24, wherein the geographic information includes an IP address.

28. A method of determining price values for one of a plurality of advertisements, each advertisement being associated with one or more confidence values and a target area, the method comprising:
   receiving, at a first node on a network, a price value for a plurality of confidence values associated with an advertisement, where a confidence value is indicative of the likelihood that an advertisement is displayed to a client device within the target area associated with the advertisement;
   receiving, from a client device on the network, location data indicative of a geographic area of the client device;
   determining a confidence value of the client device based on the likelihood that the client device is within the target area;
   determining a price value based on the confidence value; and
   transmitting, to a second node on the network, the price value.

29. The method of claim 28, further comprising:
   determining a geographic area of the client device from the location data;
   selecting an advertisement by comparing the target area associated with the plurality of advertisements with the geographic area of the client device; and
   transmitting the selected advertisement to the client device.

30. The method of claim 29, wherein the selected advertisement is displayed on a display of the client device.

31. The method of claim 28, wherein the step of determining a price value further comprises comparing the confidence value of the client device to the price values associated with the selected advertisement.

32. The method of claim 28, further comprising displaying the price value on a display of the second node.

33. The method of claim 28, wherein the price values increase as the likelihood increases.

34. The method of claim 28, wherein the confidence values are expressed as specific percentages.

35. The method of claim 28, wherein the confidence values are expressed as a range of values.

36. A computer-usable recording medium recorded with a program for use by a computing device and for determining a price value associated with an advertisement, wherein the advertisement is one of a plurality of advertisements, each of the plurality of advertisements being associated with a target set and a likelihood value, the program comprising:
   computer code that receives a price value for a likelihood value associated with an advertisement, wherein the likelihood value is indicative of the likelihood that a device is at a geographic location that is within the both a potential location set and a target set;
   computer code that receives a request including location data from a client device;
   computer code that determines a potential location set comprising a set of geographic locations at which the device may be located at the time of the request, and wherein the potential location set is determined based on the location data;
   computer code that determines a likelihood value for the client device by comparing the potential location set and the target set associated with the plurality of advertisements; and
   computer code that determines a price value based on the likelihood value.

37. The computer-usable recording medium of claim 36, the program further comprising:
   computer code that selects an advertisement from the plurality of advertisements based on the likelihood value of the client device and the likelihood value associated with each advertisement; and
   computer code that transmits the selected advertisement to the client device.

38. The computer-usable recording medium of claim 36, the program further comprising computer code that transmits the price value to a node on the network.

39. The computer-usable recording medium of claim 36, wherein the location data comprises latitude/longitude information.

40. The computer-usable recording medium of claim 36, wherein the location data comprises a location of a wireless telephone base station.

41. The computer-usable recording medium of claim 36, wherein the location data comprises an IP address.

42. The computer-usable recording medium of claim 41, wherein the IP address is associated with an intermediary device.

43. The computer-usable recording medium of claim 41, wherein the IP address is associated with the client device.

44. A system comprising:
   a first computer at a first node of a network;
   the first computer having access to a set of instructions for execution by the first computer and access to advertisements, each advertisement associated with a target set of geographic locations and a confidence value; and
   a second computer at a second node of the network different from the first node, the second computer comprising a user input device, an electronic display, a processor and instructions for execution by the processor;
   the instructions of the first computer comprising:
      receiving a price value for a confidence value associated with an advertisement, where a confidence value is indicative of the likelihood that an advertisement is displayed at a client computer on the network within the target area associated with the advertisement;

receiving location data indicative of a geographic area of a client computer on the network;

determining a geographic area of the client computer;

selecting an advertisement from a plurality of advertisements, each advertisement associated with a target area, such that the geographic area of the client device is within the target area of the selected advertisement;

determining a confidence value of the client computer based on the likelihood that the geographic area of the client computer is within the target area associated with the advertisement;

determining a price value based on the confidence value; and transmitting the determined price value.

45. The system of claim 44, wherein the instructions of the client device further comprise:

transmitting a price value associated with a confidence value;

receiving the determined price value; and displaying, on the electronic display the determined price value.

46. The system of claim 44 wherein the instructions of the first computer further comprise transmitting the selected advertisement to the client computer if the confidence value associated with the selected advertisement is less than or equal to the confidence value of the client computer.

47. A system comprising:

a first computer at a first node of a network, the first computer having access to a set of instructions for execution by the first computer and access to advertisements, each advertisement associated with an accuracy level; and a second computer at a second node of the network different from the first node, the second computer comprising a user input device, an electronic display, a processor and instructions for execution by the processor;

the instructions of the first computer comprising:

receiving geographic information associated with a client device, the geographic information being associated with an accuracy;

selecting an advertisement from the plurality of advertisements based on the accuracy level of the received geographic information and the accuracy level associated with the selected advertisement; and transmitting, to the client device, the selected advertisement;

the instructions of the second computer comprising:

receiving the selected advertisement; and displaying the selected advertisement.

48. The system of claim 47, wherein the instructions of the first computer further comprise:

receiving an advertiser bid specifying a keyword and a first accuracy level;

receiving the keyword from the user device; and wherein selecting an advertisement based on the accuracy level includes comparing the specified keyword with the request for information and comparing the first accuracy level with the accuracy level of the received geographic information.

49. The system of claim 48, wherein the advertiser bid selection of the first accuracy level is one of a plurality of predetermined accuracy levels.

50. A computer-usable recording medium recorded with a program for use by a computing device and for providing an advertisement and a price value, wherein the advertisement is one of a plurality of advertisements, each of the plurality of advertisements being associated an accuracy value, the program comprising:

computer code that computer code that receives, for each of the plurality of advertisements, a price value for an accuracy value associated with an advertisement, wherein the accuracy value is indicative of the accuracy of received geographic information;

computer code that receives a request including geographic information from a client device;

computer code that determines an accuracy value associated with the received geographic information;

computer code that selects one of the plurality of advertisements based on the determined accuracy value and the accuracy values associated with the plurality of advertisements; and computer code that transmits both the selected accuracy value and the price value associated with the selected advertisement.

51. The computer-usable recording medium of claim 50, the program further comprising:

computer code that that receives, for each of the plurality of advertisements, a keyword, wherein the request for information is associated with a keyword; and computer code that selects the selected advertisement based on the keyword associated with the advertisement and the request.

52. The computer-usable recording medium of claim 50, the program further comprising:

computer code that receives, for each of the plurality of advertisements, a target set of geographic locations;

computer code that determines a geographic area of the client device from the received geographic information; and computer code that selects the selected advertisement such that the geographic area of the client device is within the target set of the selected advertisement.

* * * * *

UNITED STATES PATENT AND TRADEMARK OFFICE
CERTIFICATE OF CORRECTION

| | | |
|---|---|---|
| PATENT NO. | : 8,401,897 B1 | Page 1 of 1 |
| APPLICATION NO. | : 12/550946 | |
| DATED | : March 19, 2013 | |
| INVENTOR(S) | : Surojit Chatterjee | |

It is certified that error appears in the above-identified patent and that said Letters Patent is hereby corrected as shown below:

In the Claims
    Column 14, line 50, delete "the" (first occurrence).
    Column 16, line 12, delete "the".
    Column 17, line 40, after "accuracy" insert -- level --.
    Column 18, line 16, after "associated" insert -- with --; line 18, delete "computer code that";
line 36, delete "that" (second occurrence).

Signed and Sealed this
Second Day of February, 2016

Michelle K. Lee
*Director of the United States Patent and Trademark Office*